(12) United States Patent
Zhang et al.

(10) Patent No.: US 9,264,249 B2
(45) Date of Patent: Feb. 16, 2016

(54) EXTENDING CYCLIC PREFIX LENGTH IN WIRELESS COMMUNICATION NETWORK HAVING MIXED CARRIER

(71) Applicant: QUALCOMM Incorporated, San Diego, CA (US)

(72) Inventors: Xiaoxia Zhang, San Diego, CA (US); Gordon Kent Walker, Poway, CA (US); Durga Prasad Malladi, San Diego, CA (US); Jun Wang, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 13/783,071

(22) Filed: Mar. 1, 2013

(65) Prior Publication Data
US 2013/0258935 A1 Oct. 3, 2013

Related U.S. Application Data

(60) Provisional application No. 61/616,782, filed on Mar. 28, 2012.

(51) Int. Cl.
*H04L 12/18* (2006.01)
*H04L 5/00* (2006.01)
(Continued)

(52) U.S. Cl.
CPC ............ *H04L 12/189* (2013.01); *H04L 5/0007* (2013.01); *H04L 5/0037* (2013.01); *H04L 27/2602* (2013.01); *H04L 27/2607* (2013.01); *H04W 72/005* (2013.01)

(58) Field of Classification Search
None
See application file for complete search history.

(56) References Cited

U.S. PATENT DOCUMENTS 8,077,801 B2  12/2011  Malladi
8,948,064 B2*  2/2015  Shahar .................. H04L 5/0037
                                                              370/278

(Continued)

FOREIGN PATENT DOCUMENTS

WO   2006086093 A1   8/2006
WO   2008084634 A1   7/2008
WO   2008086461 A2   7/2008

OTHER PUBLICATIONS

Ericsson: "Extended parameter space for MBMS", 3GPP Draft; R1-063150, 3rd Generation Partnership Project (3GPP), Mobile Competence Centre; 650, Route Des Lucioles ; F-06921 Sophia-Antipolis Cedex; France, vol. RAN WG1, no. Riga, Latvia; Nov. 1, 2006, XP050103605, [retrieved on Nov. 1, 2006].

(Continued)

*Primary Examiner* — Steve Young
(74) *Attorney, Agent, or Firm* — Arent Fox LLP

(57) ABSTRACT

A method, an apparatus, and a computer program product are provided for receiving unicast and multicast-broadcast single frequency network (MBSFN) signals from an eNB in a subframe. The apparatus receives at least one transmission in the subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP). The apparatus further receives at least one unicast signal including the at least one unicast symbol at a first partition of the subframe, and receives at least one MBSFN signal including the plurality of MBSFN symbols respectively at a second partition through sixth partition of the subframe, each MBSFN symbol having the associated CP with a length of at least 33.33 μs.

60 Claims, 16 Drawing Sheets

(51) Int. Cl.
*H04L 27/26* (2006.01)
*H04W 72/00* (2009.01)

(56) References Cited

U.S. PATENT DOCUMENTS

| | | | |
|---|---|---|---|
| 9,125,072 B2* | 9/2015 | Ji | H04L 1/0027 455/452.1 |
| 2006/0176966 A1* | 8/2006 | Stewart et al. | 375/260 |
| 2008/0267317 A1* | 10/2008 | Malladi | 375/299 |
| 2009/0252077 A1* | 10/2009 | Khandekar et al. | 370/312 |
| 2009/0296645 A1* | 12/2009 | Bui | 370/329 |
| 2011/0090983 A1 | 4/2011 | Zhang et al. | |
| 2011/0103286 A1 | 5/2011 | Montojo et al. | |
| 2011/0164549 A1 | 7/2011 | Huang et al. | |
| 2012/0014286 A1 | 1/2012 | Wang et al. | |
| 2012/0020421 A1* | 1/2012 | Larsson et al. | 375/260 |
| 2012/0140778 A1 | 6/2012 | Wang et al. | |
| 2012/0275370 A1* | 11/2012 | Cho et al. | 370/312 |

OTHER PUBLICATIONS

International Search Report and Written Opinion—PCT/US2013/028917—ISA/EPO—Jun. 25, 2013.
LG Electronics: "SCH structure for dedicated MBMS", 3GPP Draft; R1-081261_LGE_SCH_DEDICATEDMBMS, 3rd Generation Partnership Project (3GPP), Mobile Competence Centre; 650, Route Des Lucioles ; F-06921 Sophia-Antipolis Cedex; France, vol. RAN WG1 no. Shenzhen, China; Mar. 26, 2008, XP050109702, [retrieved on Mar. 26, 2008].

* cited by examiner

EXTENDING CYCLIC PREFIX LENGTH IN WIRELESS COMMUNICATION NETWORK HAVING MIXED CARRIER

CROSS-REFERENCE TO RELATED APPLICATION(S)

This application claims the benefit of U.S. Provisional Application Ser. No. 61/616,782, entitled "EXTENDING CYCLIC PREFIX LENGTH IN WIRELESS COMMUNICATION NETWORK HAVING MIXED CARRIER" and filed on Mar. 28, 2012, which is expressly incorporated by reference herein in its entirety.

BACKGROUND

1. Field

The present disclosure relates generally to communication systems, and more particularly, to extending a length of a cyclic prefix used for transmitting signals in a wireless communication system implementing a mixed carrier design.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and providing better integration with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In an MBSFN transmission structure implementing a MBSFN-dedicated carrier design, an entire carrier may be used for MBSFN traffic. However, no unicast traffic is carried or transmitted using such structure. Therefore, the MBSFN-dedicated carrier inefficiently utilizes system resources because of its inability to transmit/receive unicast services. Moreover, in some deployment scenarios, usable signal energies may arrive later at a receiver because of greater propagation delay due to a larger cell size. In such scenarios, a currently used cyclic prefix (CP) length may not be sufficient to capture all usable MBSFN signals, resulting in lower MBSFN gain, because usable signals having longer propagation delay may appear as noise. Accordingly, the disclosure solves the previous problems by providing an MBSFN transmission structure implementing a mixed carrier design, wherein unicast and MBSFN signaling is performed, and an extended MBMS CP length is used to allow MBSFN signals with longer propagation delays to be combined at the receiver.

SUMMARY

A method, an apparatus, and a computer program product are provided for transmitting/receiving unicast and multicast-broadcast single frequency network (MBSFN) signals in a subframe. In an aspect of the disclosure, the apparatus divides the subframe into six partitions, the subframe for transmitting at least one unicast symbol and a plurality of multicast-broadcast single frequency network (MBSFN) symbols, each of the at least one unicast symbol and the plurality of MBSFN symbols having an associated cyclic prefix (CP). The apparatus further designates a first partition of the subframe for transmitting the at least one unicast symbol, designates a second partition through sixth partition of the subframe for respectively transmitting the plurality of MBSFN symbols, determines a length of each CP associated with the plurality of MBSFN symbols to be at least 33.33 µs, transmits at least one unicast signal, the at least one unicast signal including the at least one unicast symbol in the first partition, and transmits at least one MBSFN signal, the at least one MBSFN signal including the plurality of MBSFN symbols respectively in the second partition through sixth partition, each MBSFN symbol having the associated CP with the length of at least 33.33 µs.

In another aspect of the disclosure, the apparatus receives at least one transmission in the subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP), receives at least one unicast signal including the at least one unicast symbol at a first partition of the subframe, and receives at least one MBSFN signal including the plurality of MBSFN symbols respectively at a second partition through sixth partition of the subframe, each MBSFN symbol having the associated CP with a length of at least 33.33 µs.

DETAILED DESCRIPTION

Figure 1:
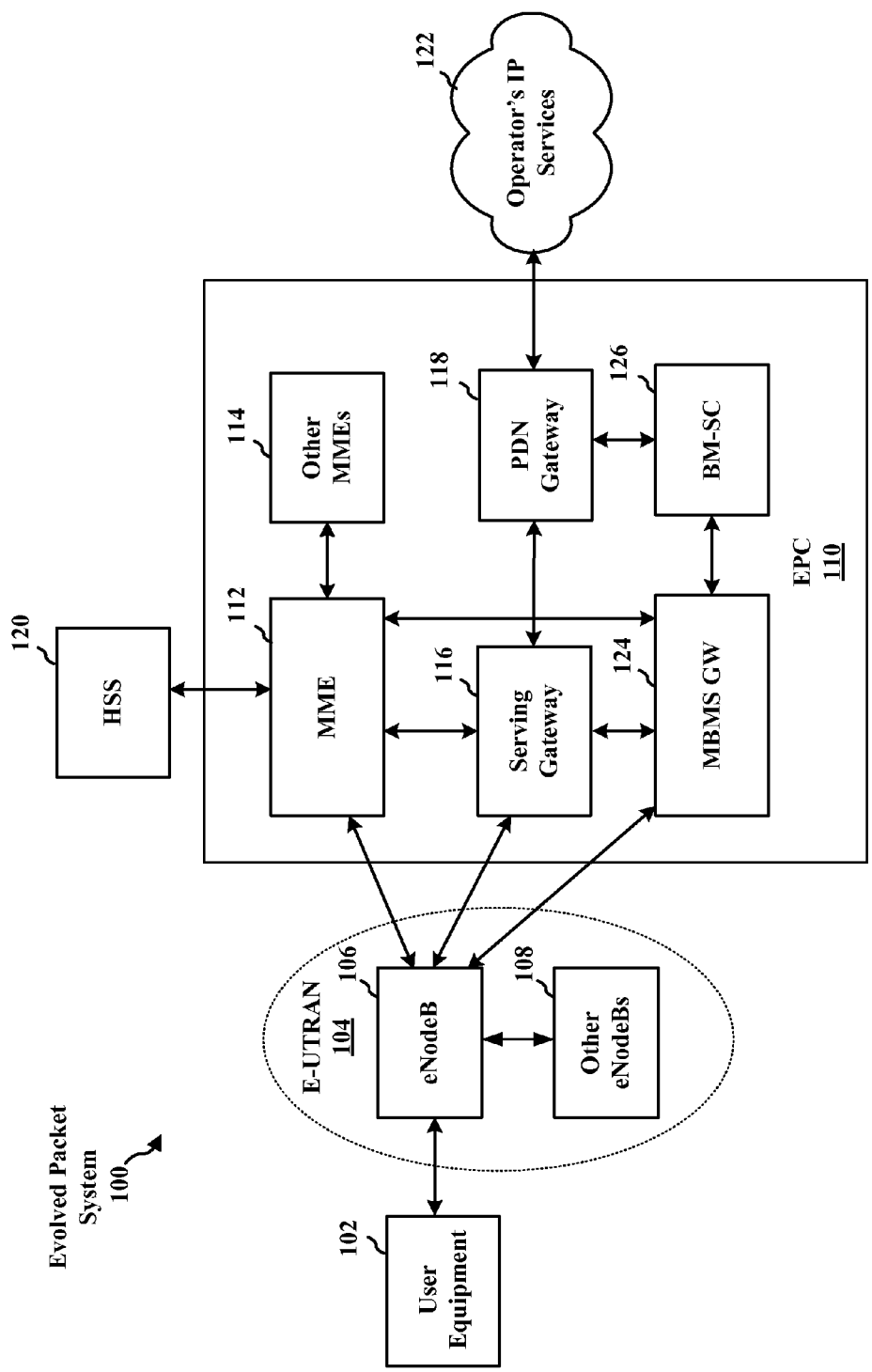
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
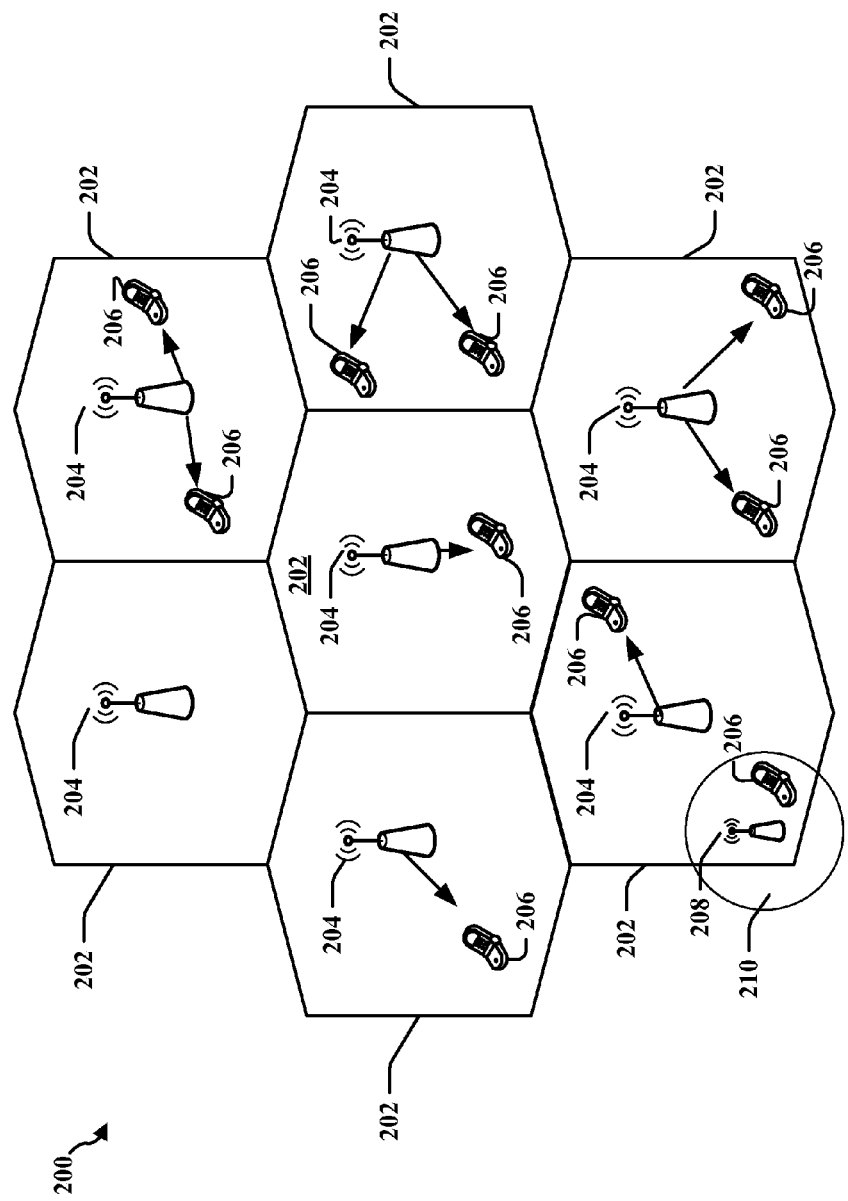
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
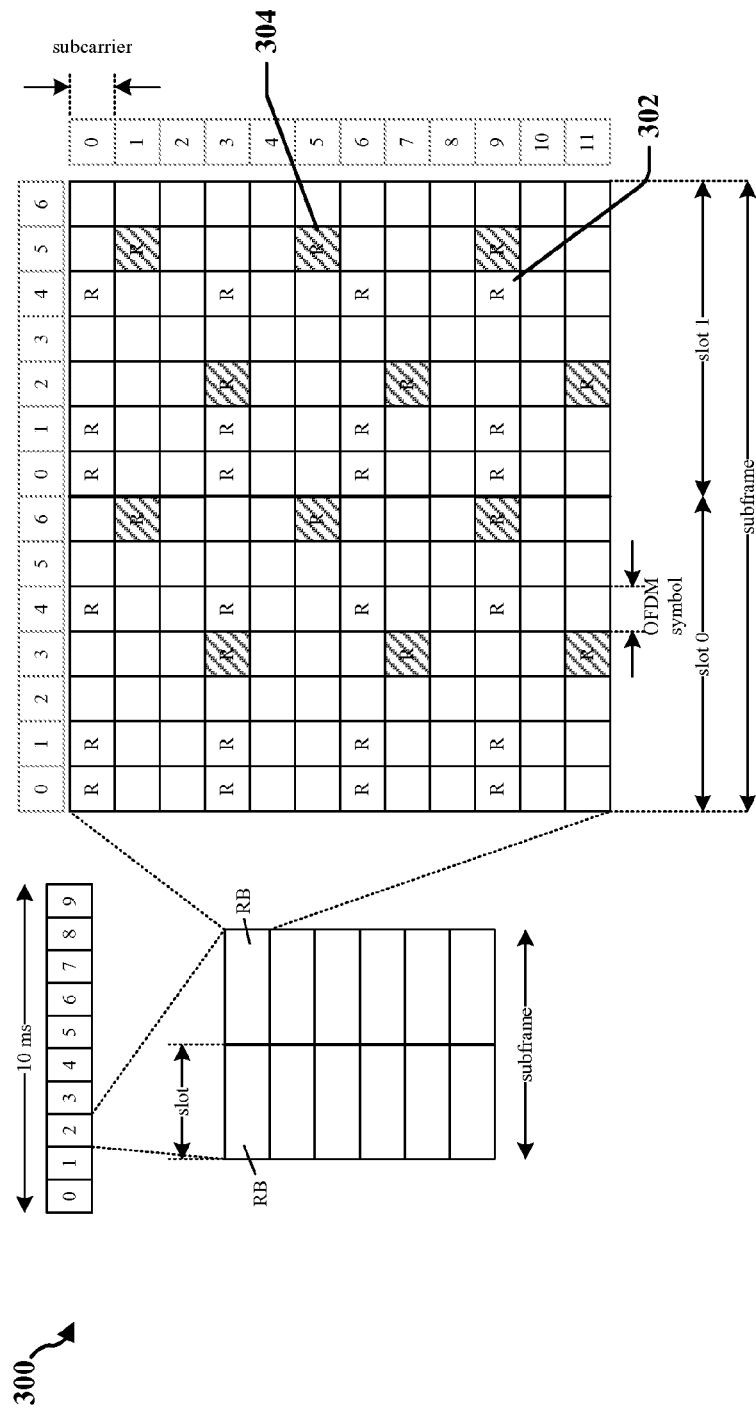
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
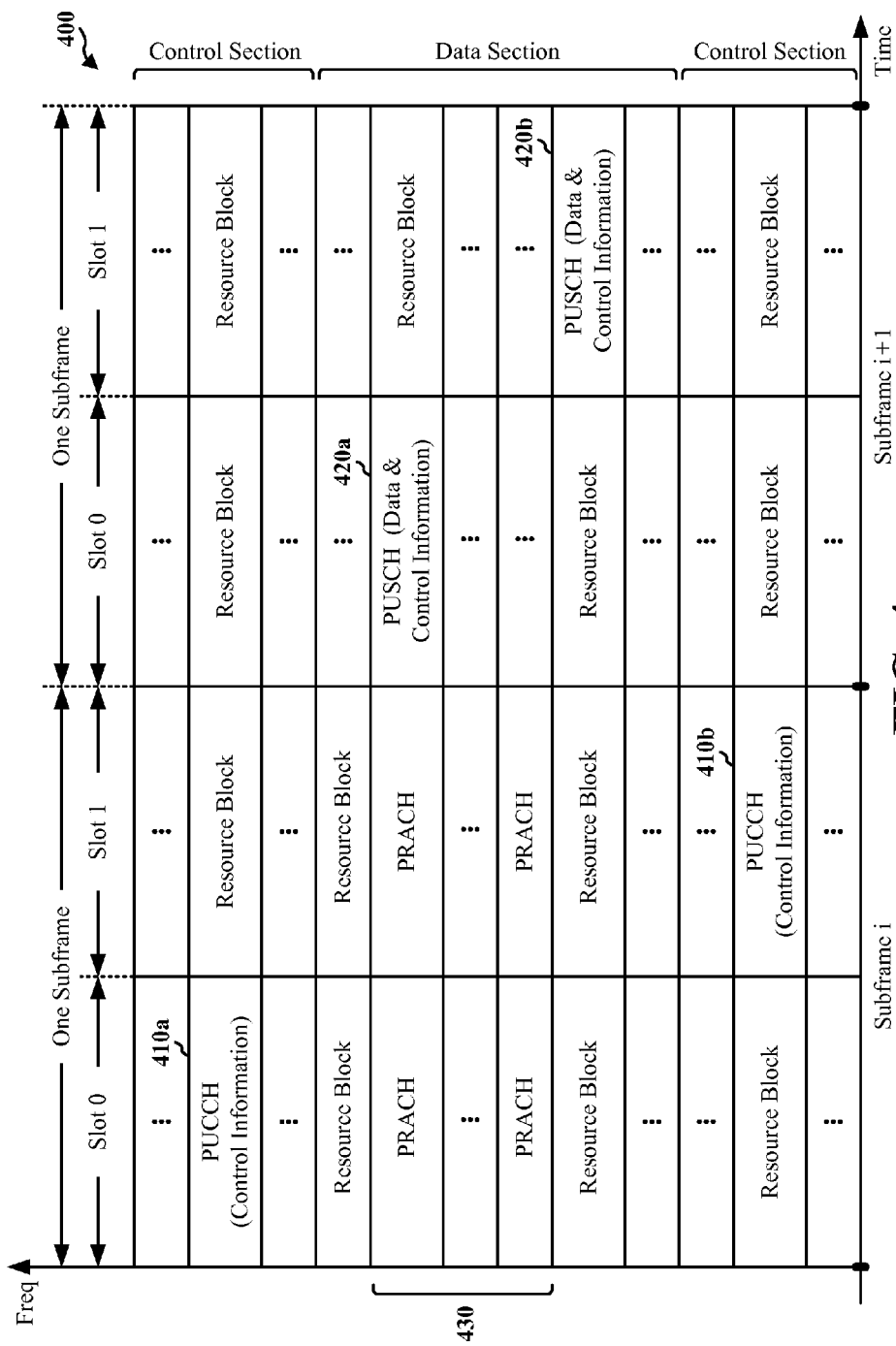
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
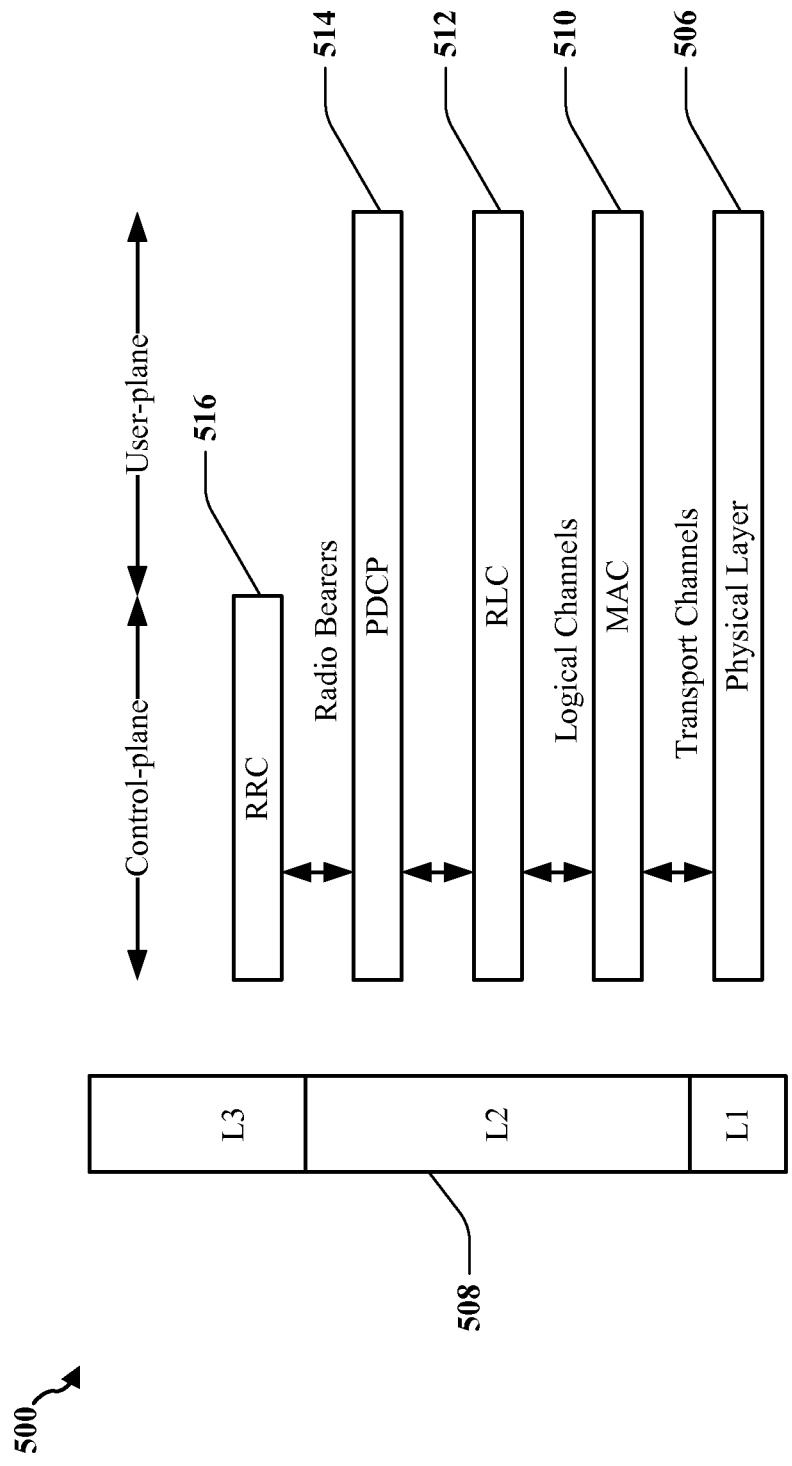
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
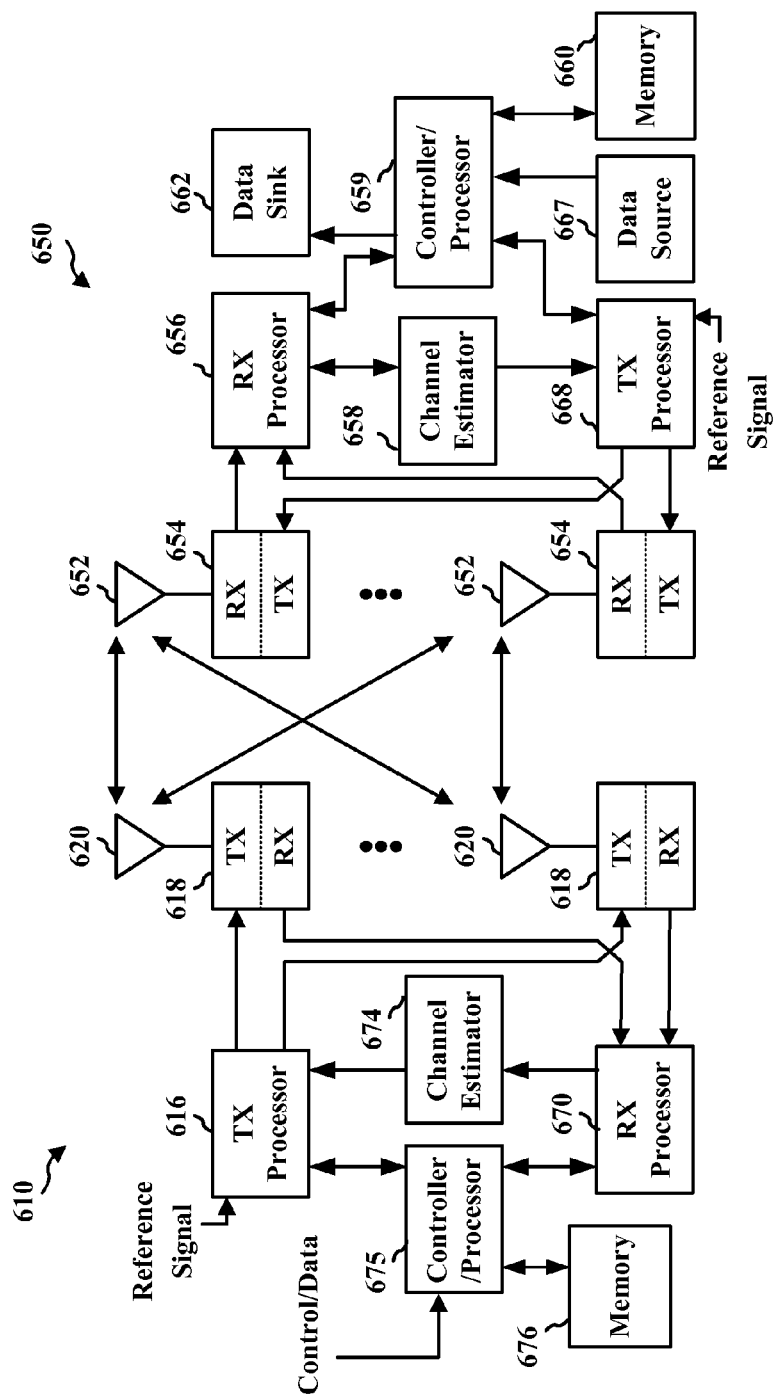
FIG. 6 is a diagram illustrating an example of an evolved Node B and user equipment in an access network.

FIG. 6 shows a block diagram of an eNB 610 in communication with a UE 650 in an access network. In the DL, upper layer packets from the core network may be provided to a controller/processor 675. The controller/processor 675 may implement the functionality of the L2 layer. In the DL, the controller/processor 675 may provide header compression, ciphering, packet segmentation and reordering, multiplexing between logical and transport channels, and radio resource allocations to the UE 650 based on various priority metrics. The controller/processor 675 may also be responsible for HARQ operations, retransmission of lost packets, and signaling to the UE 650.

The transmit (TX) processor 616 may implement various signal processing functions for the L1 layer (i.e., physical layer). The signal processing functions may include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX may receive a signal through its respective antenna 652. Each receiver 654RX recovers information modulated onto an RF carrier and provides the information to the receive (RX) processor 656. The RX processor 656 may implement various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 may convert the OFDM symbol stream from the time-domain to the frequency domain using a Fast Fourier Transform (FFT). The frequency domain signal may comprise a separate OFDM symbol stream for each subcarrier of the OFDM signal. The symbols on each subcarrier, and the reference signal, may be recovered and demodulated by determining the most likely signal constellation points transmitted by the eNB 610. These soft decisions may be based on channel estimates computed by the channel estimator 658. The soft decisions may be decoded and deinterleaved to recover the data and control signals that were originally transmitted by the eNB 610 on the physical channel. The data and control signals may be provided to the controller/processor 659.

The controller/processor 659 may implement the L2 layer. The controller/processor can be associated with a memory 660 that stores program codes and data. The memory 660 may be referred to as a computer-readable medium. In the UL, the controller/processor 659 may provide demultiplexing between transport and logical channels, packet reassembly, deciphering, header decompression, control signal processing to recover upper layer packets from the core network. The upper layer packets may be provided to a data sink 662, which represents all the protocol layers above the L2 layer. Various control signals may also be provided to the data sink 662 for L3 processing. The controller/processor 659 may also be responsible for error detection using an acknowledgement (ACK) and/or negative acknowledgement (NACK) protocol to support HARQ operations.

In the UL, a data source 667 may be used to provide upper layer packets to the controller/processor 659. The data source 667 may represent all protocol layers above the L2 layer. Similar to the functionality described in connection with the DL transmission by the eNB 610, the controller/processor 659 may implement the L2 layer for the user plane and the control plane by providing header compression, ciphering, packet segmentation and reordering, and multiplexing between logical and transport channels based on radio resource allocations by the eNB 610. The controller/processor 659 may also be responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission may be processed at the eNB 610 in a manner similar to that described in connection with the receiver function at the UE 650. Each receiver 618RX may receive a signal through its respective antenna 620. Each receiver 618RX may recover information modulated onto an RF carrier and provide the information to a RX processor 670. The RX processor 670 may implement the L1 layer.

The controller/processor 675 may implement the L2 layer. The controller/processor 675 can be associated with a memory 676 that stores program codes and data. The memory 676 may be referred to as a computer-readable medium. In the UL, the control/processor 675 may provide demultiplexing between transport and logical channels, packet reassembly, deciphering, header decompression, control signal processing to recover upper layer packets from the UE 650. Upper layer packets from the controller/processor 675 may be provided to the core network. The controller/processor 675 may also be responsible for error detection using an ACK and/or NACK protocol to support HARQ operations.

Figure 7:
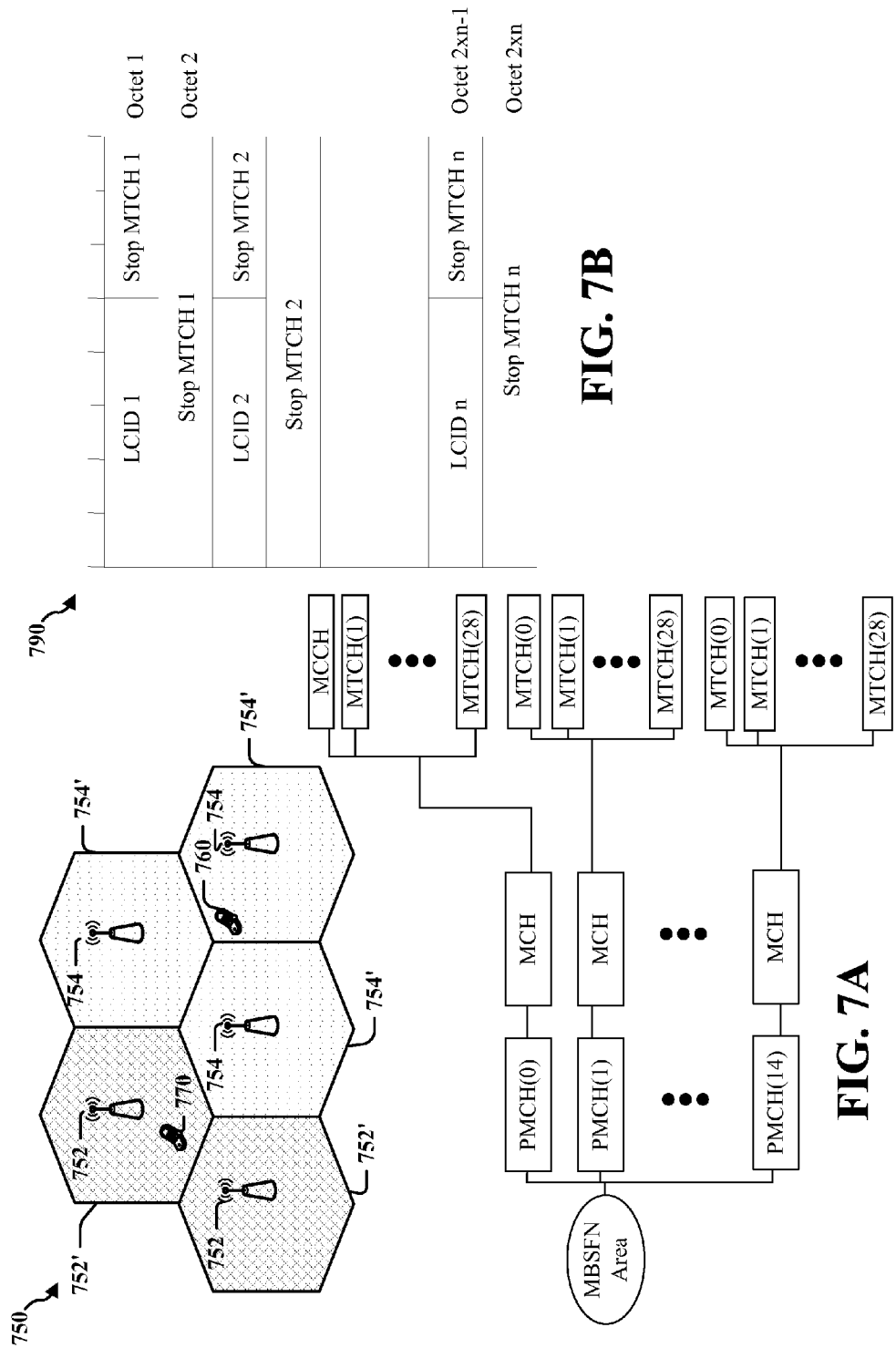
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE acquires a system information block (SIB) 13 (SIB13). In a second step, based on the SIB13, the UE acquires an MBSFN Area Configuration message on an MCCH. In a third step, based on the MBSFN Area Configuration message, the UE acquires an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There is one MSI per PMCH per MBSFN area.

Figure 8:
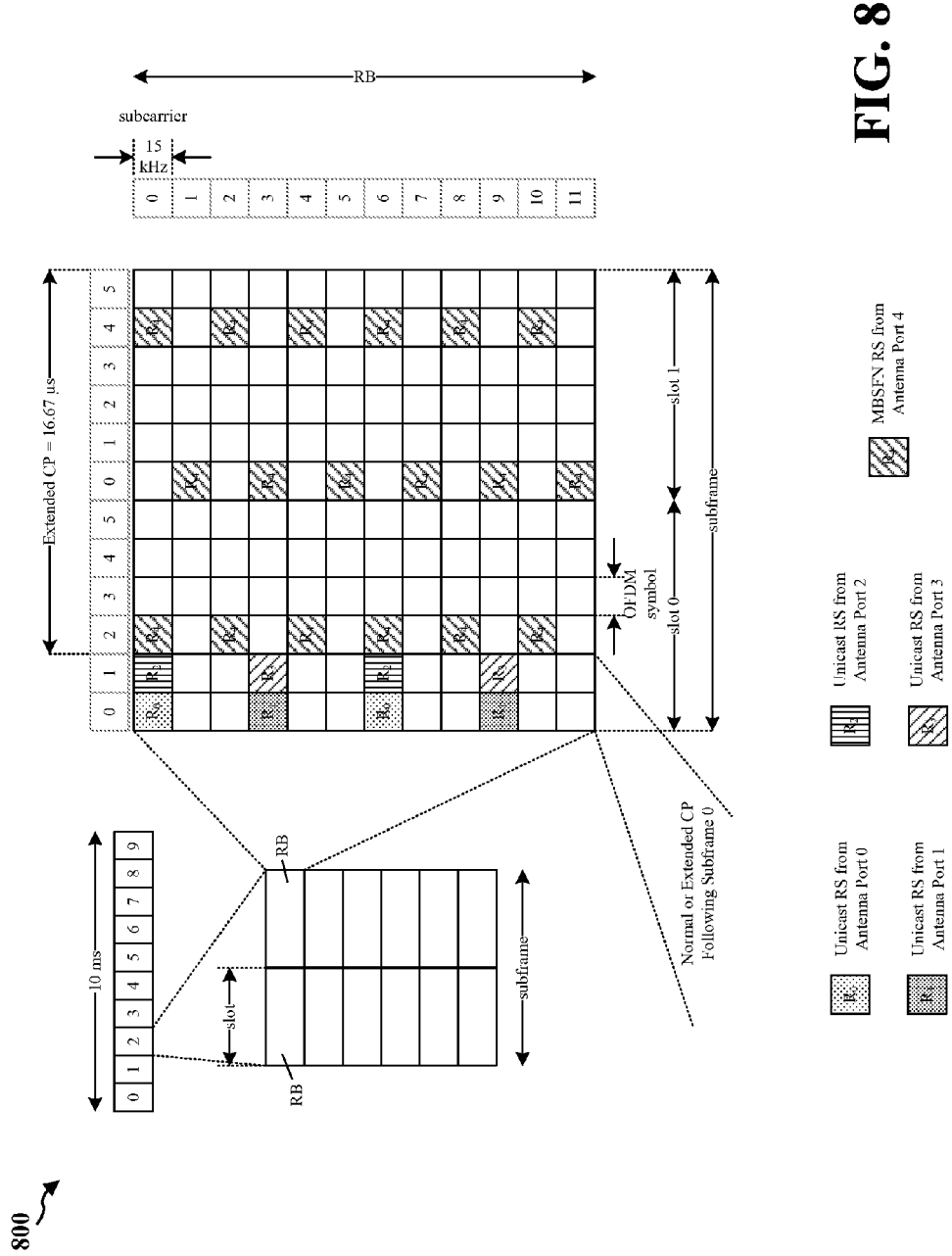
FIG. 8 is a diagram illustrating an MBSFN transmission structure implementing a mixed carrier design.

FIG. 8 is a diagram 800 illustrating an MBSFN transmission structure implementing a mixed carrier design. Currently, eMBMS may be supported on a mixed carrier where the mixed carrier supports both unicast and eMBMS services. On a particular mixed carrier, time division multiplexing (TDM) may be used to partition resources between unicast and eMBMS transmissions/receptions. This allows flexible and dynamic spectrum utilization.

Referring to FIG. 8, a subset of all available subframes in a frame, e.g., up to 60% of the frame, may be reserved for MBSFN transmission/reception. The subframes reserved for MBSFN transmission/reception may be referred to as MBSFN subframes. For example, subframes 0, 4, 5, and 9 of the frame may be configured for a primary synchronization signal (PSS), a secondary synchronization signal (SSS), a physical broadcast channel (PBCH), a system information block (SIB), and unicast services. Subframes 1, 2, 3, 6, 7, and 8 may be configured as MBSFN subframes.

Still referring to FIG. 8, each MBSFN subframe may be divided into 12 symbols for respectively transmitting/receiving signals (e.g., OFDM symbols). For example, in each MBSFN subframe, the first one or two symbols may be used for transmitting/receiving symbols containing a unicast reference signal (RS) and control signaling while the rest of the partitions may be used for transmitting/receiving symbols containing MBSFN signaling. A cyclic prefix (CP) length of the first one or two symbols may be the same as a length of a CP used in an initial subframe (e.g., subframe 0). Each of the MBSFN symbols has an extended CP length of 16.67 µs. Moreover, subcarriers in the mixed carrier are spaced at 15 kHz. If the CP length of the first one or two symbols is different from the CP length of each of the MBSFN symbols, then a gap exists in between the first one or two symbols and the MBSFN symbols.

Figure 9:
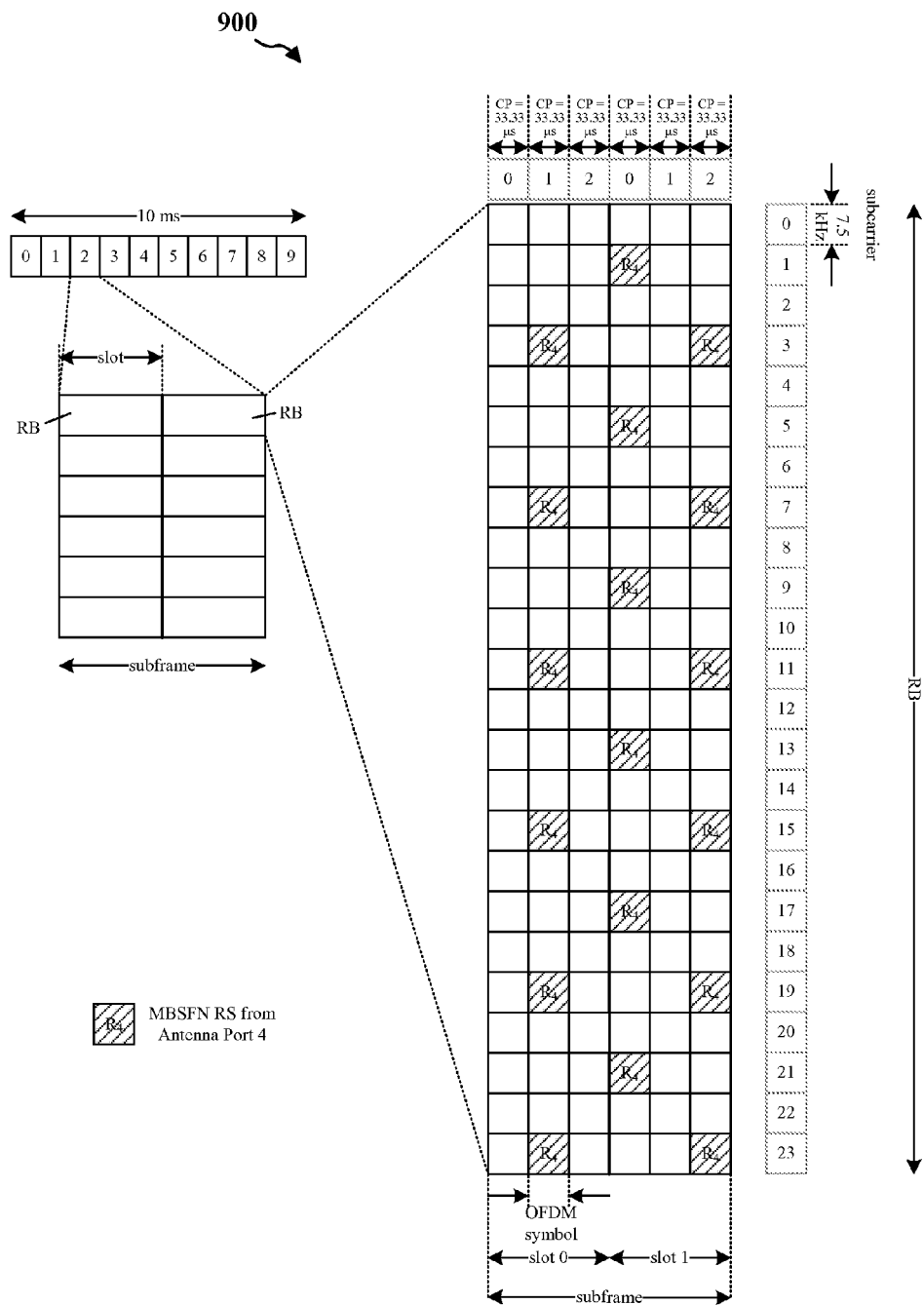
FIG. 9 is a diagram illustrating an MBSFN transmission structure implementing an MBSFN-dedicated carrier design.

FIG. 9 is a diagram 900 illustrating a MBSFN transmission structure implementing a MBSFN-dedicated carrier design. Referring to FIG. 9, a physical layer may define the subframe structure for a MBSFN-dedicated carrier. Here, the entire carrier may be used for MBSFN traffic. Hence, no unicast traffic is carried or transmitted using the structure of FIG. 9. The MBSFN-dedicated carrier may be attached to a base carrier for implementation.

Referring to FIG. 9, the MBSFN-dedicated carrier may be divided into six partitions for exclusively transmitting/receiving symbols containing MBSFN traffic. Each of the MBSFN symbols may have an extended MBMS CP length of 33.33 µs (also referred to herein as a longer CP length). Moreover, subcarriers in the MBSFN-dedicated carrier may be spaced at 7.5 kHz. The MBSFN-dedicated carrier may inefficiently utilize system resources. For example, when MBSFN services are present, resources cannot be reallocated for other uses, such as to transmit/receive unicast services. Thus, upper layer signaling (e.g., for partitioning the subframe and setting the CP length of each MBSFN symbol) may not be supported if there is a lack of interest in using a dedicated carrier for sending eMBMS services alone.

In some deployment scenarios, usable signal energies may arrive later at a receiver with a larger cellular region (may also be referred to as cell size herein) because of greater propagation delay. For example, in rural areas, larger cell sizes may be used because fewer interfering transmissions exist and signals can travel farther before being attenuated or blocked. In such scenarios, the extended CP length of 16.67 µs may not be sufficient to capture all usable MBSFN signals, resulting in reduced MBSFN gain at the receiver. The MBSFN signals with longer propagation delay appear as noise rather than contributing to the MBSFN gain. For example, the extended CP length of 16.67 µs may be sufficient to cover a cell or an MBSFN area having a radius of approximately 5 km. However, for cells or MBSFN areas that are relatively large (e.g., radius greater than 5 km), a longer CP length may be needed to accommodate the additional propagation delay present due to the signal energies arriving later because of the larger cell or MBSFN area size. As such, performance may be improved by extending the CP length from 16.67 µs to at least 33.33 µs so that the usable signals with greater propagation delay do not appear as noise. The extended MBMS CP length of at least 33.33 µs helps to increase MBSFN gain by allowing MBSFN signals with longer propagation delays to be combined at the receiver.

Figure 10:
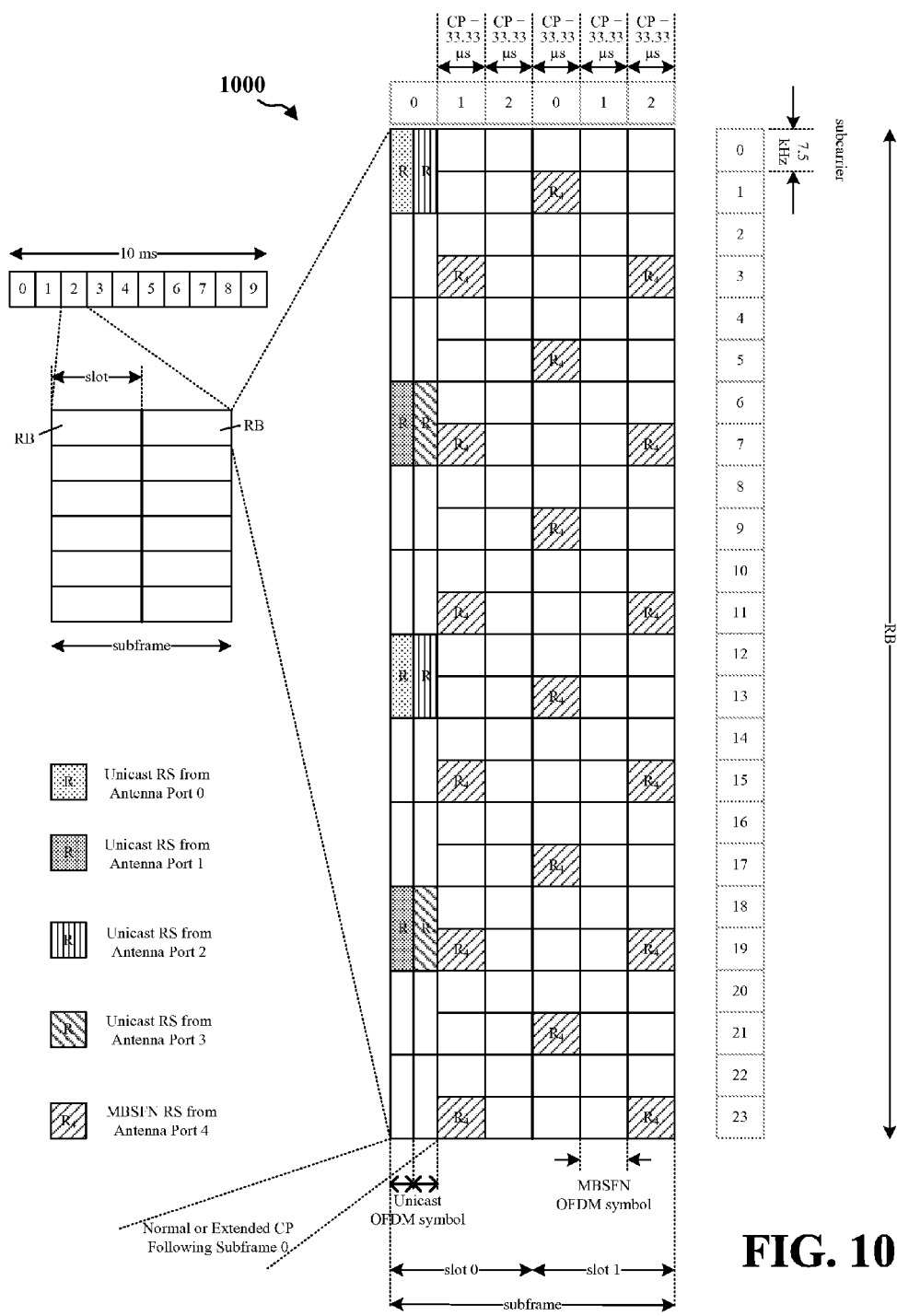
FIG. 10 is a diagram illustrating an MBSFN transmission structure implementing a mixed carrier design, wherein MBSFN symbols have an extended MBMS CP length of at least 33.33 μs.

FIG. 10 is a diagram 1000 illustrating an MBSFN transmission structure implementing a mixed carrier design, wherein MBSFN symbols have an extended MBMS CP length of at least 33.33 µs. Referring to FIG. 10, the MBSFN-dedicated carrier of FIG. 9 may be modified to also handle unicast signals. Notably, the mixed carrier of FIG. 10 still allows for up to 60% of all available subframes in a frame to be reserved for MBSFN transmission/reception.

The subframe of the mixed carrier of FIG. 10 may be divided into six partitions for respectively transmitting/receiving symbols. Six partitions may be chosen for the mixed carrier to maintain the structure of the MBSFN-dedicated carrier of FIG. 9 while allowing unicast traffic to be communicated. The first partition may be used for transmitting/receiving symbols containing unicast traffic. Notably, the first partition is long enough to communicate two unicast symbols. A cyclic prefix (CP) length of the unicast symbols follows a length of a CP used in an initial subframe (e.g., subframe 0). If only one unicast symbol is transmitted/received in the first partition, then a gap may exist between the one unicast symbol in the first partition and a first MBSFN symbol transmitted/received at a second partition of the subframe. If the gap exists, then no symbol may be transmitted/received in the gap. Alternatively, a second unicast symbol may be configured for transmitting an additional unicast reference signal or a redundant unicast control signal in the gap. A length of the second unicast symbol reduces a length of the gap when the second unicast symbol is configured for transmission in the gap. The second unicast symbol may not occupy an entire the length of the gap. Therefore, a shorter-length gap may exist when the second unicast symbol is transmitted in the gap. In another alternative, the gap may be used to extend the CP length of the first MBSFN symbol transmitted/received in the second partition. Use of the gap may be across an entire MBSFN area. Moreover, the second unicast symbol may be inserted in the gap when an increase in unicast traffic exists.

Each of the MBSFN symbols of the mixed carrier of FIG. 10 has an extended MBMS CP length of at least 33.33 µs. Moreover, subcarriers for the MBSFN symbols in the mixed carrier are spaced at 7.5 kHz. Additionally, the design of FIG. 10 may be modified to include a CP type because the CP length for the MBSFN symbols can be extended to at least 33.33 µs without dedicating one carrier to eMBMS. In addition, the design of FIG. 10 is compatible with other mixed-carrier and MBSFN-dedicated carrier designs.

Legacy UEs may not be able to support the extended MBMS CP length of 33.33 µs while new UEs may be able to support both the extended CP length of 16.67 µs and the extended MBMS CP length of 33.33 µs. Accordingly, MBSFN subframes transmitted in the mixed carrier of FIG. 10 may be partitioned into two sets: 1) a set of MBSFN subframes supporting a legacy CP length of 16.67 µs; and 2) a set of MBSFN subframes supporting an extended MBMS CP length of 33.33 µs intended for new UEs only. Thus, the legacy UEs can decode MBSFN services with the legacy CP length of 16.67 µs in the mixed carrier of FIG. 10 while the new UEs can decode all MBSFN services in the mixed carrier of FIG. 10.

A CP type for each MBSFN subframe may be indicated via a system information message, information carried on a multicast control channel (MCCH), or MBMS scheduling information (MSI). The system information message may be a system information block (SIB), such as SIB13, which carries MBMS-related control information. When the MCE/eNB performs scheduling, the MCE/eNB may assure that services targeted for all UEs including legacy UEs use a legacy CP type (e.g., corresponding to a CP length of 16.67 µs). Legacy UEs assume the legacy CP type for demodulation. In contrast, new UEs may read a CP type indication to determine a CP length for demodulation. In an aspect, correspondence exists between the CP type and the CP length. For example, the CP type and the CP length may convey the same information. In another example, the CP type may convey information that maps to/indicates a particular CP length. For instance, the CP type may convey information indicating a legacy CP type that maps to a CP length of 16.67 μs. Accordingly, whether the CP type or CP length is signaled to a UE, the UE can determine an appropriate CP length for demodulation because of the correspondence between the CP type and the CP length.

As discussed supra, the CP type or CP length for the MBSFN symbols of the subframe may be indicated in a system information message (e.g., SIB13). For example, an MBSFN-AreaInfoList information element may be modified to add the CP type or CP length.

Moreover, the CP type or CP length for the MBSFN symbols of the subframe may be indicated via MCCH. For example, different physical multicast channels (PMCHs) may be used to indicate different CP types or CP lengths. As such, a PMCH-InfoList information element may be modified to add the CP type or CP length. The CP type or CP length used by MCCH and MSI may be indicated in a SIB or may be predefined (e.g., the legacy CP length (16.67 μs)). In an aspect, the CP length for a unicast symbol may be predefined as a legacy CP type (e.g. corresponding to a CP length of 16.67 μs) while the CP length for an MBSFN symbol may be predefined as an extended MBMS CP type or longer (e.g., corresponding to a CP length of 33.33 μs or longer).

The CP type or CP length for the MBSFN symbols of the subframe may also be indicated via MSI. Different multicast traffic channels (MTCHs) may be used to indicate different CP types or CP lengths. The CP type or CP length used by MCCH and MSI may be indicated in a SIB or may be predefined (e.g., the legacy CP length). As such, the CP type or CP length may be added in MSI as shown in Table 1 below.

TABLE 1

| LCID 1 | Stop MTCH 1 | Oct 1 |
|---|---|---|
| Stop MTCH 1 | | Oct 2 |
| LCID 2 | Stop MTCH 2 | Oct 3 |
| Stop MTCH 2 | | Oct 4 |
| ... | | |
| LCID n | Stop MTCH n | Oct 2n-1 |
| Stop MTCH n | | Oct 2n |
| LCID 1 | CP type | new field |
| LCID 2 | CP type | new field |
| ... | | |
| LCID n | CP type | new field |

Regarding Table 1, an MCH scheduling information MAC control element may be identified by a MAC PDU subheader with a logical channel ID (LCID). The control element may have a variable size. For each MTCH, the following fields may be included: 1) LCID; and 2) Stop MTCH. The LCID field indicates the Logical Channel ID of the MTCH. A length of the LCID field may be 5 bits. The Stop MTCH field indicates an ordinal number of the subframe within the MCH scheduling period, counting only the subframes allocated to the MCH, where the corresponding MTCH stops. A value 0 corresponds to the first subframe. A length of the Stop MTCH field may be 11 bits. A special Stop MTCH value of 2047 indicates that the corresponding MTCH is not scheduled. Values ranging between 2043 and 2046 may be reserved.

Figure 11:
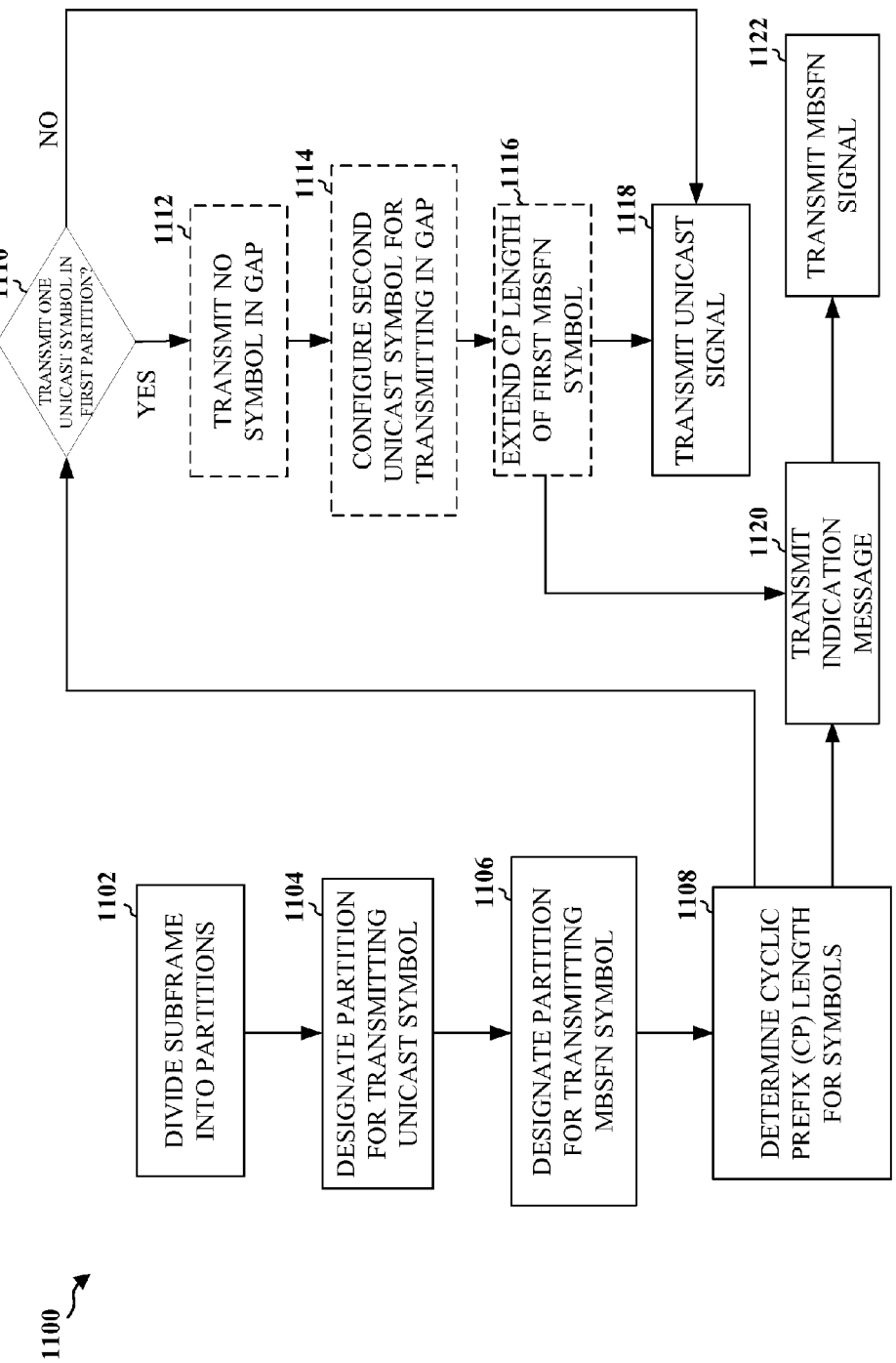
FIG. 11 is a flow chart of a method of wireless communication.

FIG. 11 is a flow chart 1100 of a method of wireless communication for transmitting unicast and multicast-broadcast single frequency network (MBSFN) signals in a subframe. The method may be performed by an eNB.

At step 1102, the eNB may divide the subframe into a number of partitions or durations (e.g., six partitions or durations). The eNB may use the subframe to transmit at least one unicast symbol in a first partition and a plurality of MBSFN symbols in the remaining partitions, respectively. Each of the at least one unicast symbol and the plurality of MBSFN symbols may have an associated cyclic prefix (CP).

The number of partitions may be determined according to a desired length of the CP associated with each of the plurality of MBSFN symbols while allowing for up to 60% of all available subframes in a frame to be reserved for MBSFN transmission/reception. For example, in a given subframe having a fixed duration, if a longer CP length is desired for each MBSFN symbol, then a lesser number of MBSFN symbols may be provided because of the limited length of the subframe. Accordingly, the subframe may be divided into fewer partitions in order to respectively transmit each MBSFN symbol. Conversely, if a shorter CP length is desired for each MBSFN symbol, then a greater number of MBSFN symbols may be provided within the limited length of the subframe, and the subframe may be divided into more partitions to respectively transmit each MBSFN symbol. Hence, for fewer subframe partitions, a longer CP may be transmitted. For more subframe partitions, a shorter CP may be transmitted.

At step 1104, the eNB may designate a first partition of the subframe for transmitting the at least one unicast symbol. At step 1106, the eNB may designate a second partition through sixth partition of the subframe for respectively transmitting the plurality of MBSFN symbols.

At step 1108, the eNB may determine a length of the CP associated with the symbols. For example, the eNB may determine the length of the CP associated with the at least one unicast symbol based on a CP length of an initial subframe (e.g., subframe 0). In another example, the eNB may determine the length of each CP associated with the plurality of MBSFN symbols to be at least 33.33 μs, the CP length that helps increase MBSFN gain by allowing MBSFN signals with longer propagation delays to be combined at a receiver.

At step 1110, the eNB may determine whether to transmit either one unicast symbol or two unicast symbols in the first partition of the subframe based on which antenna ports currently transmit a unicast reference signal. As shown in FIG. 10, antenna ports 0 and 1 transmit unicast reference signals in the first unicast symbol in the first partition of the subframe, and antenna ports 2 and 3 transmit unicast reference signals in the second unicast symbol in the first partition of the subframe. If the eNB determines that two unicast symbols will be transmitted in the first partition of the subframe, then the UE proceeds to step 1118, wherein at least one unicast signal including the two unicast symbols are transmitted in the first partition.

At step 1112, if the eNB determines that one unicast symbol will be transmitted in the first partition of the subframe, then the eNB may not transmit any symbol at a gap between the one unicast symbol in the first partition of the subframe and a first MBSFN symbol in the second partition of the subframe. The silencing of all eNBs within the same MBSFN area at the gap allows the gap to be used for noise and/or interference estimation at the UE.

At step 1114, in addition, or in the alternative, if the eNB determines that one unicast symbol will be transmitted in the first partition of the subframe, then the eNB may configure a second unicast symbol for transmitting in the gap. The eNB may use the second unicast symbol to transmit an additional unicast reference signal or a redundant unicast control signal to the UE. Doing so provides additional signaling to the UE while mitigating waste of system resources.

At step 1116, in addition, or in the alternative, if the eNB determines that one unicast symbol will be transmitted in the first partition of the subframe, then the eNB may extend a CP length of the first MBSFN symbol in the second partition of the subframe beyond 33.33 µs. By extending the CP length beyond 33.33 µs for the first MBSFN symbol when only one unicast symbol is transmitted in the first partition, processing of the first MBSFN symbol at the receiver may be enhanced (e.g., enhanced time tracking loop (TTL) or frequency tracking loop (FTL). An extended MBMS CP length of the first MBSFN symbol in the second partition of the subframe may be equal to the following sum: 33.33 µs+(length of gap). At step 1118, the eNB transmits at least one unicast signal including the one unicast symbol in the first partition.

At step 1120, the eNB may transmit an indication message to the UE to indicate at least one of a CP type or a CP length for the MBSFN symbols of the subframe. The indication message may be transmitted via a system information message, a multicast control channel (MCCH), or MBMS scheduling information (MSI), or any combination thereof.

The system information message may be a system information block (SIB), such as SIB13, which carries MBMS-related control information. An MBSFN-AreaInfoList information element of SIB13 may include the indication of the CP type or CP length.

For indicating the CP type or CP length via MCCH, different physical multicast channels (PMCHs) may indicate different CP types or CP lengths. For example, a PMCH-InfoList information element may include the CP type or CP length. The CP type or CP length used by MCCH and MSI may be indicated in a SIB or may be predefined (e.g., the legacy CP length).

For indicating the CP type or CP length via MSI, different multicast traffic channels (MTCHs) may indicate different CP types or CP lengths. For example, the CP type or CP length may be included in MSI, as shown in Table 1 above. The CP type or CP length used by MCCH and MSI may be indicated in a SIB or may be predefined (e.g., the legacy CP length).

At step 1122, the eNB may transmit at least one MBSFN signal. The at least one MBSFN signal may include the plurality of MBSFN symbols respectively in the second partition through sixth partition. Furthermore, each MBSFN symbol may have the associated CP with the length of at least 33.33 µs.

Figure 12:
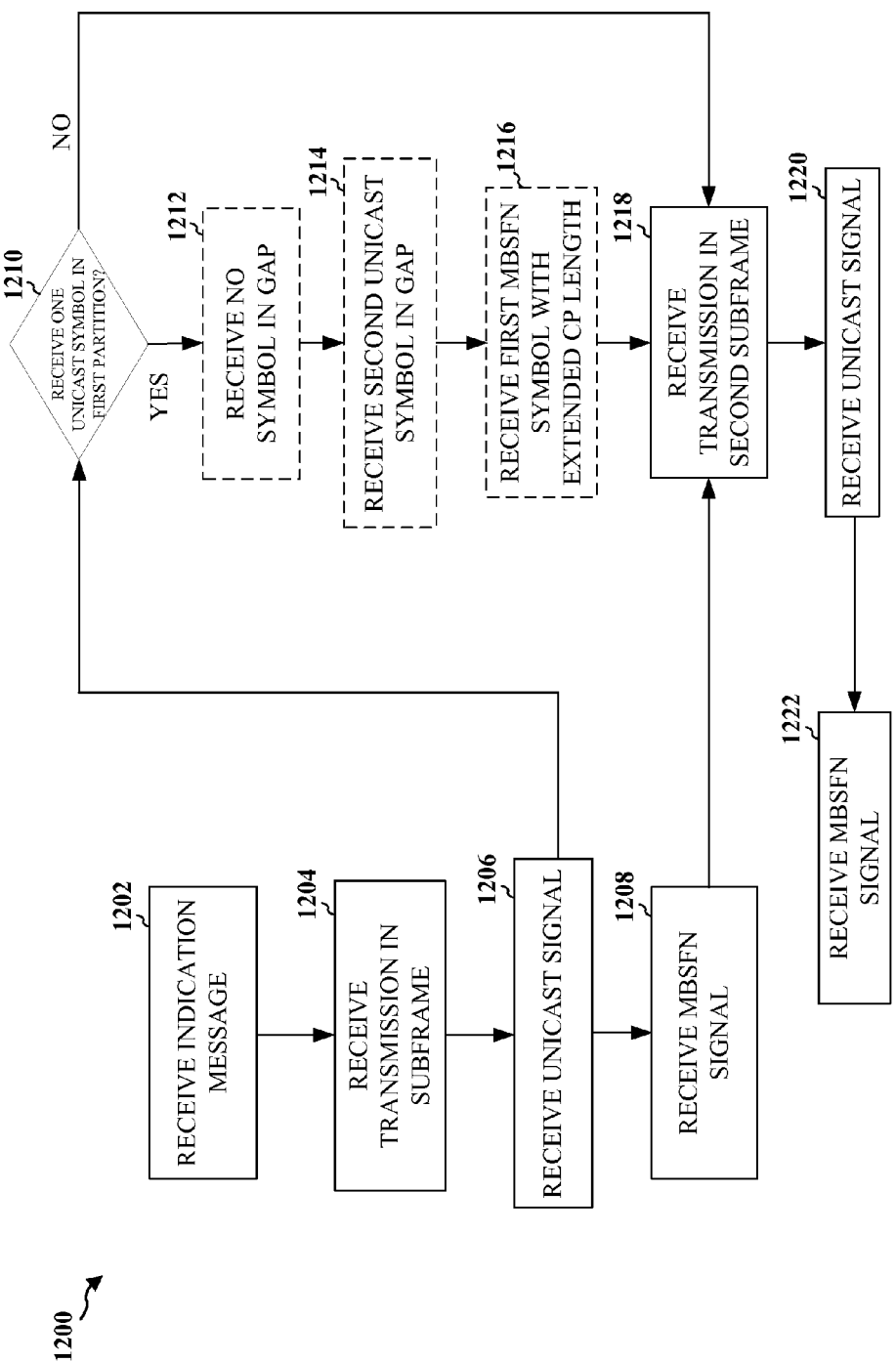
FIG. 12 is a flow chart of a method of wireless communication.

FIG. 12 is a flow chart 1200 of a method of wireless communication for receiving unicast and multicast-broadcast single frequency network (MBSFN) signals from an eNB in a subframe. The method may be performed by a UE. The subframe may be divided into a number of partitions or durations (e.g., six partitions or durations). Within the subframe, the UE may receive at least one unicast symbol in a first partition and a plurality of MBSFN symbols in the remaining partitions, respectively. Each of the at least one unicast symbol and the plurality of MBSFN symbols may have an associated cyclic prefix (CP).

At step 1202, the UE may receive an indication message from the eNB. The indication message may include at least one of a CP type or a CP length for the MBSFN symbols of the subframe. The indication message may be received via a system information message, a multicast control channel (MCCH), or MBMS scheduling information (MSI), or any combination thereof. The UE recovers the CP type or CP length from the indication message.

The system information message may be a system information block (SIB), such as SIB13, which carries MBMS-related control information. An MBSFN-AreaInfoList information element of SIB13 may include the indication of the CP type or CP length.

If the CP type or CP length is indicated via MCCH, different CP types or CP lengths may be indicated using different physical multicast channels (PMCHs). For example, a PMCH-InfoList information element may include the CP type or CP length. The CP type or CP length used by MCCH and MSI may be indicated in a SIB or may be predefined (e.g., the legacy CP length).

If the CP type or CP length is indicated via MSI, different CP types or CP lengths may be indicated using different multicast traffic channels (MTCHs). For example, the CP type or CP length may be included in MSI, as shown in Table 1 above. The CP type or CP length used by MCCH and MSI may be indicated in a SIB or may be predefined (e.g., the legacy CP length).

At step 1204, the UE may receive at least one transmission in the subframe. Particularly, at step 1206, the UE may receive at least one unicast signal including the at least one unicast symbol in a first partition of the subframe. A length of the CP associated with the at least one unicast symbol may be based on a CP length of an initial subframe (e.g., subframe 0).

At step 1208, the UE may receive at least one MBSFN signal including the plurality of MBSFN symbols respectively in a second partition through sixth partition of the subframe. Each MBSFN symbol may have the associated CP with a length of at least 33.33 µs. An extended MBMS CP length of 33.33 µs allows signals with a longer propagation delay to be combined at the UE, and therefore improve MBSFN receiver gain. That is, the extended MBMS CP length of 33.33 µs allows usable signals with a longer propagation delay to not appear as noise, which would be the case with a shorter CP length.

After the UE receives the at least one MBSFN signal including the plurality of MBSFN symbols having the extended MBMS CP length of at least 33.33 µs, then the UE may proceed to step 1218, wherein at least one transmission is received in a second subframe.

At step 1210, the UE may determine whether one unicast symbol or two unicast symbols is received in the first partition of the subframe. If the UE determines that two unicast symbols are received in the first partition of the subframe, then the UE proceeds to step 1218, wherein at least one transmission is received in a second subframe.

At step 1212, if the UE determines that one unicast symbol is received in the first partition of the subframe, then the UE may not receive any symbol in a gap between the one unicast symbol in the first partition of the subframe and a first MBSFN symbol in the second partition of the subframe.

At step 1214, in addition, or in the alternative, if the UE determines that one unicast symbol is received in the first partition of the subframe, then the UE may receive a second unicast symbol in the gap. The transmission of the second unicast symbol in the gap mitigates waste of system resources and provides the UE with additional signaling, such as an additional unicast reference signal or a redundant unicast control signal from the eNB.

At step 1216, in addition, or in the alternative, if the UE determines that one unicast symbol is received in the first partition of the subframe, then the UE may receive the first MBSFN symbol in the second partition of the subframe having an extended MBMS CP length beyond 33.33 µs. The extended MBMS CP length of the first MBSFN symbol in the second partition of the subframe may be equal to the following sum: 33.33 µs+(length of gap).

At step 1218, the UE may receive at least one transmission in a second subframe. Here, the second subframe may be divided into 12 partitions. Within the second subframe, the UE may receive at least one unicast symbol and a plurality of MBSFN symbols. Each of the at least one unicast symbol and the plurality of MBSFN symbols of the second subframe may have an associated cyclic prefix (CP).

At step 1220, the UE may receive at least one unicast signal. The at least one unicast signal may include at least one of a first unicast symbol in a first partition of the second subframe or a second unicast symbol in a second partition of the second subframe.

At step 1222, the UE may receive at least one MBSFN signal. The at least one MBSFN signal may include the plurality of MBSFN symbols respectively in a third partition through twelfth partition of the second subframe. Moreover, each MBSFN symbol received in the second subframe may have the associated CP with a length of 16.67 µs according to a legacy mixed carrier design.

Figure 13:
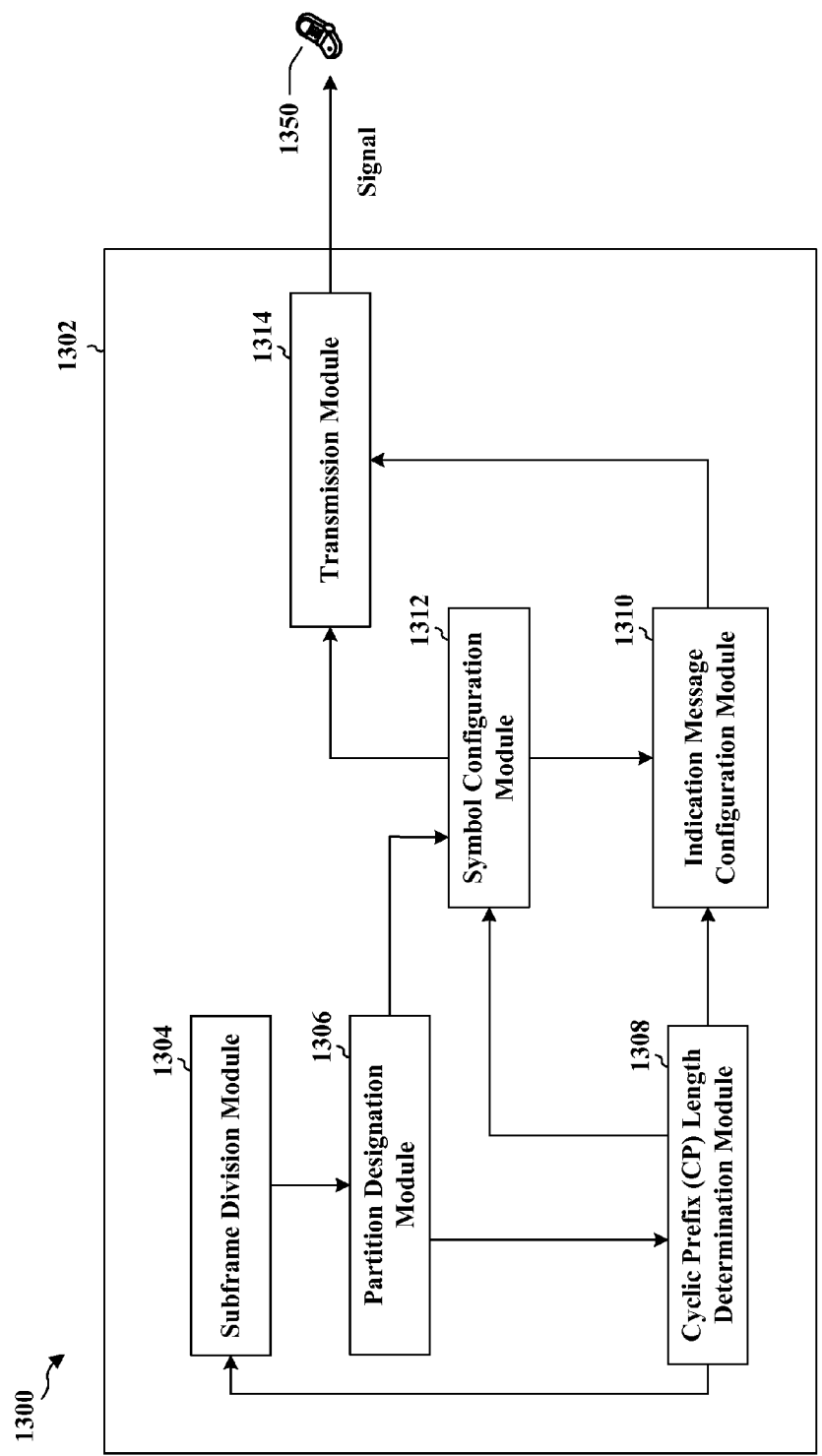
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be an eNB. The apparatus includes a subframe division module 1304, a partition designation module 1306, a cyclic prefix (CP) length determination module 1308, an indication message configuration module 1310, a symbol configuration module 1312, and a transmission module 1314.

The subframe division module 1304 may divide a subframe into a number of partitions (e.g., six partitions). The apparatus 1302 may use the subframe to transmit at least one unicast symbol in a first partition and a plurality of MBSFN symbols to a UE 1350 in the remaining partitions, respectively. Each of the at least one unicast symbol and the plurality of MBSFN symbols may have an associated cyclic prefix (CP).

The subframe division module 1304 may determine the number of partitions according to a desired length of the CP associated with each of the plurality of MBSFN symbols while allowing for up to 60% of all available subframes in a frame to be reserved for MBSFN transmission/reception. The desired CP length may be received from the CP length determination module 1308. For example, in a given subframe having a fixed duration, if a longer CP length is desired for each MBSFN symbol, then a lesser number of MBSFN symbols may be provided because of the limited length of the subframe. Accordingly, the subframe division module 1304 may divide the subframe into fewer partitions in order to respectively transmit each MBSFN symbol. Conversely, if a shorter CP length is desired for each MBSFN symbol, then a greater number of MBSFN symbols may be provided within the limited length of the subframe, and the subframe division module 1304 may divide the subframe into more partitions to respectively transmit each MBSFN symbol. Hence, for fewer subframe partitions, a longer CP may be transmitted. For more subframe partitions, a shorter CP may be transmitted.

The partition designation module 1306 may designate a first partition of the subframe for transmitting the at least one unicast symbol. The partition designation module 1306 may also designate a second partition through sixth partition of the subframe for respectively transmitting the plurality of MBSFN symbols.

The CP length determination module 1308 may determine a length of the CP associated with the symbols. For example, the CP length determination module 1308 may determine the length of the CP associated with the at least one unicast symbol based on a CP length of an initial subframe (e.g., subframe 0). In another example, the CP length determination module 1308 may determine the length of each CP associated with the plurality of MBSFN symbols to be at least 33.33 µs, the CP length that helps increase MBSFN gain by allowing MBSFN signals with longer propagation delays to be combined at a receiver.

The symbol configuration module 1312 may determine whether to transmit either one unicast symbol or two unicast symbols in the first partition of the subframe based on which antenna ports currently transmit a unicast reference signal. As shown in FIG. 10, antenna ports 0 and 1 transmit unicast reference signals in the first unicast symbol in the first partition of the subframe, and antenna ports 2 and 3 transmit unicast reference signals in the second unicast symbol in the first partition of the subframe. If the symbol configuration module 1312 determines that two unicast symbols will be transmitted in the first partition of the subframe, then the symbol configuration module 1312 will transmit, via the transmission module 1314, at least one unicast signal including the two unicast symbols in the first partition.

If the symbol configuration module 1312 determines that one unicast symbol will be transmitted in the first partition of the subframe, then the symbol configuration module 1312 may not transmit any symbol in a gap between the one unicast symbol in the first partition of the subframe and a first MBSFN symbol in the second partition of the subframe.

In addition, or in the alternative, if the symbol configuration module 1312 determines that one unicast symbol will be transmitted in the first partition of the subframe, then the symbol configuration module 1312 may configure a second unicast symbol for transmitting in the gap via the transmission module 1314. The symbol configuration module 1312 may use the second unicast symbol to transmit an additional unicast reference signal or a redundant unicast control signal to the UE 1350.

In addition, or in the alternative, if the symbol configuration module 1312 determines that one unicast symbol will be transmitted in the first partition of the subframe, then the symbol configuration module 1312 may extend a CP length of the first MBSFN symbol in the second partition of the subframe beyond 33.33 µs. By extending the CP length beyond 33.33 µs for the first MBSFN symbol when only one unicast symbol is transmitted in the first partition, processing of the first MBSFN symbol at the receiver may be enhanced (e.g., enhanced time tracking loop (TTL) or frequency tracking loop (FTL). An extended MBMS CP length of the first MBSFN symbol in the second partition of the subframe may be equal to the following sum: 33.33 µs+(length of gap). Thereafter, the symbol configuration module 1312 will transmit, via the transmission module 1314, at least one unicast signal including the one unicast symbol in the first partition.

The indication message configuration module 1310 may transmit, via the transmission module 1314, an indication message to the UE 1350 to indicate at least one of a CP type or a CP length for the MBSFN symbols of the subframe. The indication message may be transmitted via a system information message (e.g., SIB13), a multicast control channel (MCCH), or MBMS scheduling information (MSI), or any combination thereof. Thereafter, the symbol configuration module 1312 may transmit, via the transmission module 1314, at least one MBSFN signal to the UE 1350. The at least one MBSFN signal may include the plurality of MBSFN symbols respectively in the second partition through sixth partition. Furthermore, each MBSFN symbol may have the associated CP with the length of at least 33.33 µs.

Figure 14:
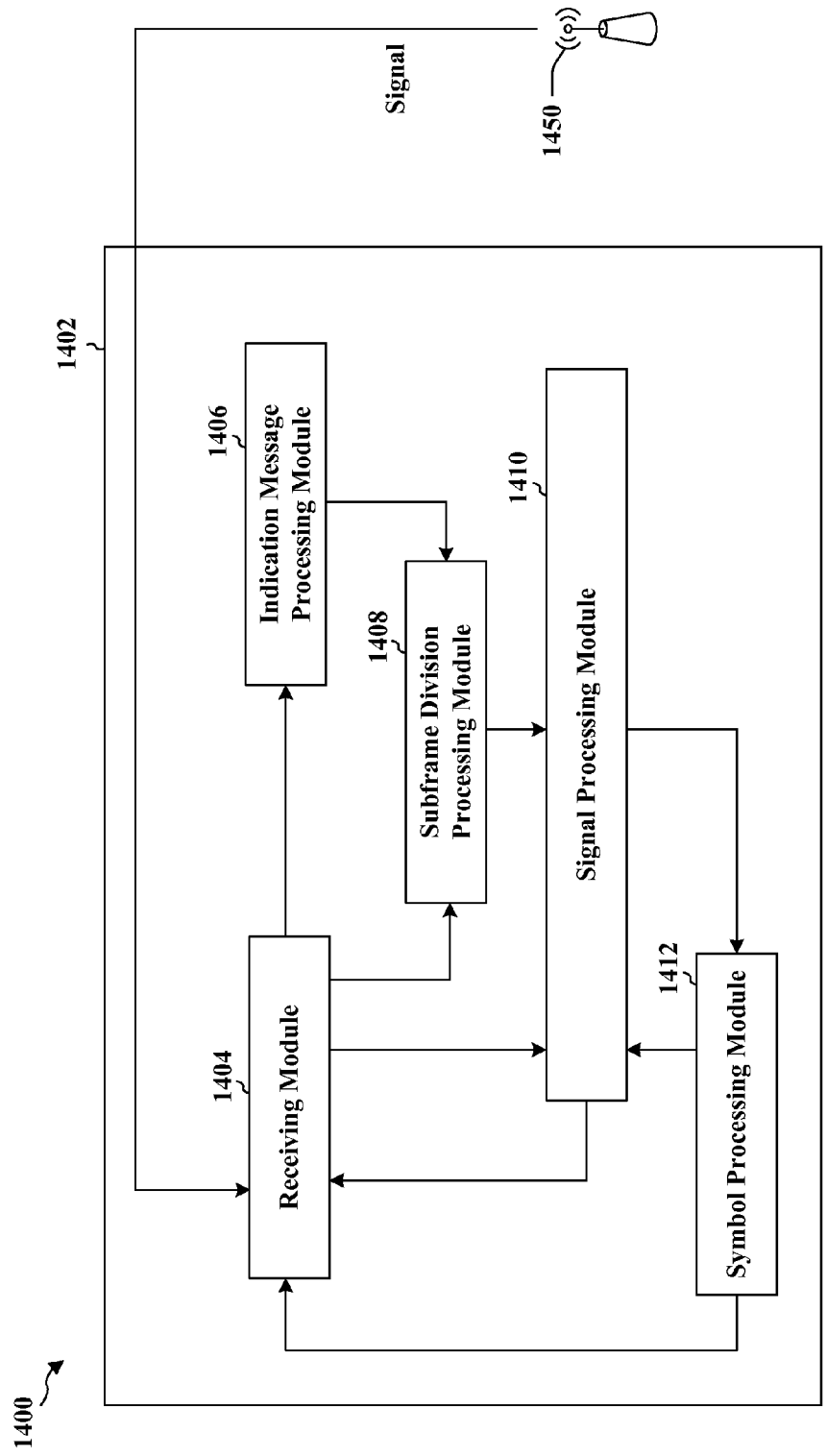
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus 1402 receives unicast and multicast-broadcast single frequency network (MBSFN) signals from an eNB 1450 in a subframe. Within the subframe, the apparatus 1402 may receive at least one unicast symbol and a plurality of MBSFN symbols. Each of the at least one unicast symbol and the plurality of MBSFN symbols may have an associated cyclic prefix (CP). The apparatus includes a receiving module 1404, an indication message processing module 1406, a subframe division processing module 1408, a signal processing module 1410, and a symbol processing module 1412.

The receiving module 1404 may receive an indication message from the eNB 1450, which is then processed by the indication information message processing module 1406. The indication message may include at least one of a CP type or a CP length for the MBSFN symbols of the subframe. The indication message may be received via a system information message (e.g., SIB13), a multicast control channel (MCCH), or MBMS scheduling information (MSI), or any combination thereof.

The receiving module 1404 may receive one or more transmissions in the subframe. The subframe may be divided into a number of partitions (e.g., six partitions). As such, the subframe division processing module 1408 may indicate the number of subframe partitions, as well as any associated CP types or CP lengths, to the signal processing module 1410 to correctly process a received transmission.

The signal processing module 1410 may receive at least one unicast signal including the at least one unicast symbol in a first partition of the subframe. A length of the CP associated with the at least one unicast symbol may be based on a CP length of an initial subframe (e.g., subframe 0).

The signal processing module 1410 may also receive at least one MBSFN signal including the plurality of MBSFN symbols respectively in a second partition through sixth partition of the subframe. Each MBSFN symbol may have the associated CP with a length of at least 33.33 µs. An extended MBMS CP length of 33.33 µs allows signals with a longer propagation delay to be combined at the apparatus 1402, and therefore improve MBSFN receiver gain. That is, the extended MBMS CP length of 33.33 µs allows usable signals with a longer propagation delay to not appear as noise, which would be the case with a shorter CP length.

After the signal processing module 1410 receives the at least one MBSFN signal including the plurality of MBSFN symbols having the CP length of at least 33.33 µs, the signal processing module 1410 may proceed to receive, via the receiving module 1404, at least one transmission in a second subframe.

The symbol processing module 1412 may determine whether one unicast symbol or two unicast symbols is received in the first partition of the subframe. If the symbol processing module 1412 determines that two unicast symbols are received in the first partition of the subframe, then the signal processing module 1410 may proceed to receive, via the receiving module 1404, at least one transmission in the second subframe.

If the symbol processing module 1412 determines that one unicast symbol is received in the first partition of the subframe, then the signal processing module 1410 may not receive any symbol at a gap between the one unicast symbol in the first partition of the subframe and a first MBSFN symbol in the second partition of the subframe.

In addition, or in the alternative, if the symbol processing module 1412 determines that one unicast symbol is received in the first partition of the subframe, then the signal processing module 1410 may receive, via the receiving module 1404, a second unicast symbol in the gap. The transmission of the second unicast symbol in the gap mitigates waste of system resources and provides the apparatus 1402 with additional signaling, such as an additional unicast reference signal or a redundant unicast control signal from the eNB 1450.

In addition, or in the alternative, if the symbol processing module 1412 determines that one unicast symbol is received in the first partition of the subframe, then the signal processing module 1410 may receive the first MBSFN symbol in the second partition of the subframe having an extended MBMS CP length beyond 33.33 µs. The extended MBMS CP length of the first MBSFN symbol in the second partition of the subframe may be equal to the following sum: 33.33 µs+ (length of gap).

The signal processing module 1410 is also capable of receiving, via the receiving module 1404, at least one transmission in the second subframe, wherein the second subframe may be divided into 12 partitions. Within the second subframe, the signal processing module 1410 may receive at least one unicast symbol and a plurality of MBSFN symbols. Each of the at least one unicast symbol and the plurality of MBSFN symbols of the second subframe may have an associated cyclic prefix (CP).

Particularly, the signal processing module 1410 may receive at least one unicast signal that includes at least one of a first unicast symbol at a first partition of the second subframe or a second unicast symbol at a second partition of the second subframe. The signal processing module 1410 may also receive at least one MBSFN signal that includes the plurality of MBSFN symbols respectively at a third partition through twelfth partition of the second subframe. Notably, each MBSFN symbol received in the second subframe may have the associated CP with a length of 16.67 µs according to a legacy mixed carrier design.

The apparatus may include additional modules that perform each of the steps of the algorithm in the aforementioned flow charts of FIGS. 11 and 12. As such, each step in the aforementioned flow charts of FIGS. 11 and 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
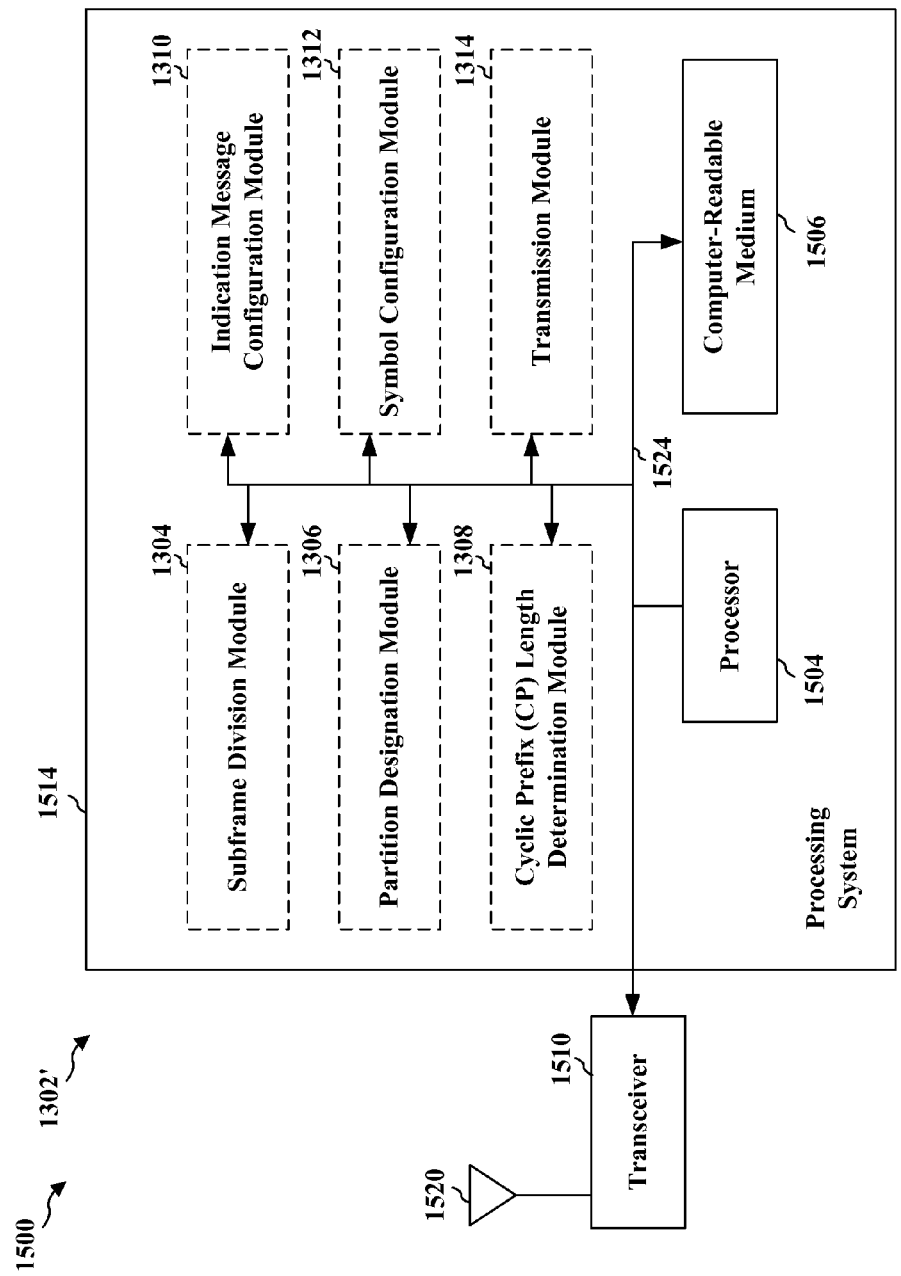
FIG. 15 is a diagram illustrating an example of a hardware implementation for an apparatus employing a processing system.

FIG. 15 is a diagram illustrating an example of a hardware implementation for an apparatus 1302' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1304, 1306, 1308, 1310, 1312, 1314, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1304, 1306, 1308, 1310, 1312, and 1314. The modules may be software modules running in the processor 1504, resident/stored in the computer readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1302/1302' for wireless communication includes means for dividing a subframe into six partitions, the subframe for transmitting at least one unicast symbol and a plurality of multicast-broadcast single frequency network (MBSFN) symbols, each of the at least one unicast symbol and the plurality of MBSFN symbols having an associated cyclic prefix (CP), means for designating a first partition of the subframe for transmitting the at least one unicast symbol, means for designating a second partition through sixth partition of the subframe for respectively transmitting the plurality of MBSFN symbols, means for determining a length of each CP associated with the plurality of MBSFN symbols to be at least 33.33 µs, means for transmitting at least one unicast signal, the at least one unicast signal including the at least one unicast symbol in the first partition, and means for transmitting at least one MBSFN signal, the at least one MBSFN signal including the plurality of MBSFN symbols respectively in the second partition through sixth partition, each MBSFN symbol having the associated CP with the length of at least 33.33 µs, means for transmitting no symbol in a gap between the one unicast symbol in the first partition of the subframe and a first MBSFN symbol in the second partition of the subframe, means for configuring a second unicast symbol for transmitting in the gap, means for extending a CP length of the first MBSFN symbol in the second partition of the subframe beyond 33.33 µs, means for transmitting an indication message including at least one of a CP type or a CP length for the MBSFN symbols of the subframe.

The aforementioned means may be one or more of the aforementioned modules of the apparatus 1302 and/or the processing system 1514 of the apparatus 1302' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 16:
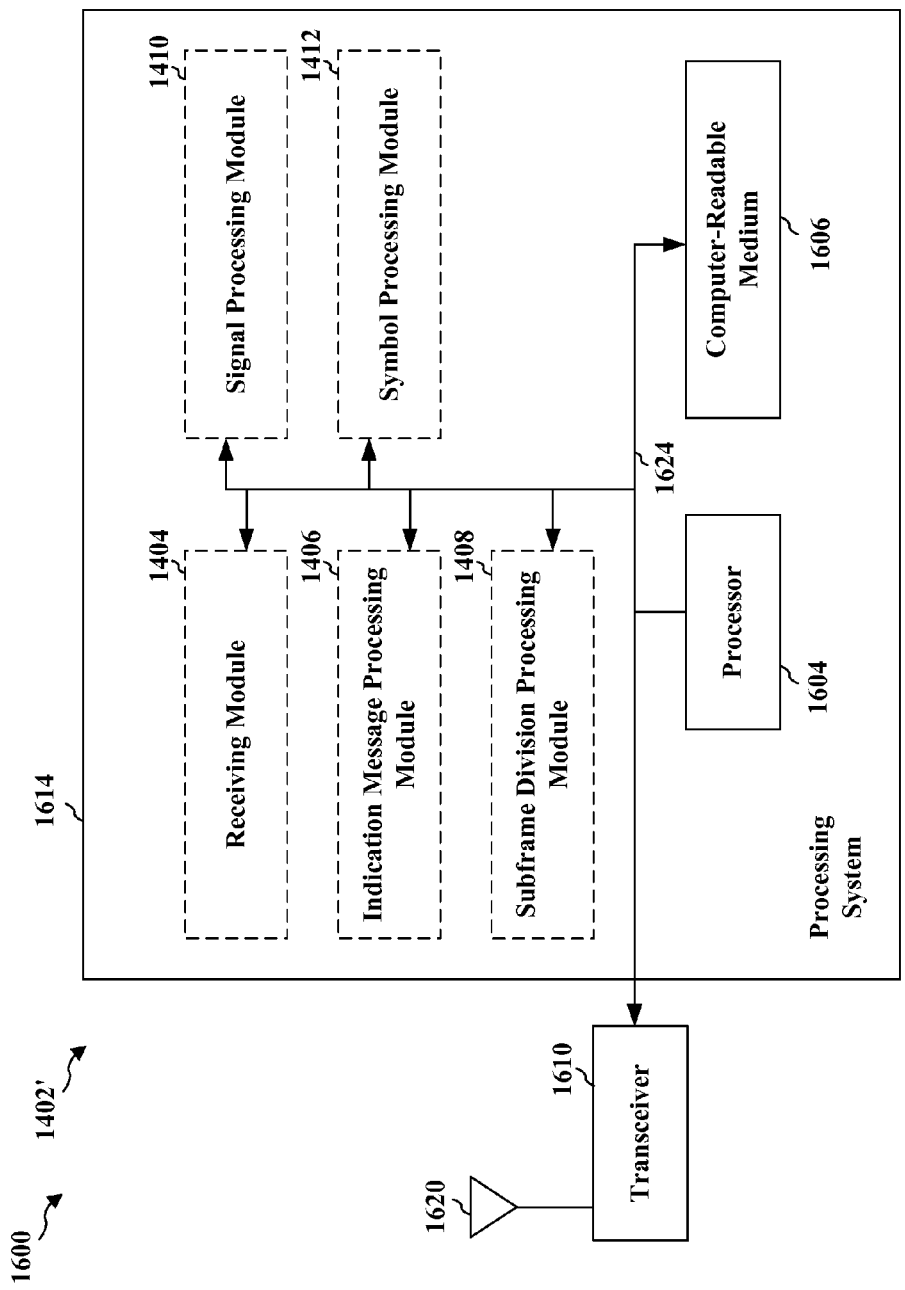
FIG. 16 is a diagram illustrating an example of a hardware implementation for an apparatus employing a processing system.

FIG. 16 is a diagram illustrating an example of a hardware implementation for an apparatus 1402' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1404, 1406, 1408, 1410, 1412 and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1404, 1406, 1408, 1410, and 1412. The modules may be software modules running in the processor 1604, resident/stored in the computer readable medium 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1402/1402' for wireless communication includes means for receiving at least one transmission in a subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP), means for receiving at least one unicast signal including the at least one unicast symbol at a first partition of the subframe, means for receiving at least one MBSFN signal including the plurality of MBSFN symbols respectively at a second partition through sixth partition of the subframe, each MBSFN symbol having the associated CP with a length of at least 33.33 µs, means for receiving no symbol in a gap between the one unicast symbol in the first partition of the subframe and a first MBSFN symbol in the second partition of the subframe, means for receiving a second unicast symbol in the gap, means for receiving the first MBSFN symbol in the second partition of the subframe with an extended MBMS CP length beyond 33.33 µs, means for receiving an indication message including at least one of a CP type or a CP length for the MBSFN symbols of the subframe, means for receiving at least one transmission in a second subframe, the second subframe divided into 12 partitions and for receiving at least one unicast symbol and a plurality of MBSFN symbols, each of the at least one unicast symbol and the plurality of MBSFN symbols of the second subframe having an associated cyclic prefix (CP), means for receiving at least one unicast signal including at least one of a first unicast symbol at a first partition of the second subframe or a second unicast symbol at a second partition of the second subframe, and means for receiving at least one MBSFN signal including the plurality of MBSFN symbols respectively at a third partition through twelfth partition of the second subframe, each MBSFN symbol having the associated CP with a length of 16.67 µs.

The aforementioned means may be one or more of the aforementioned modules of the apparatus 1402 and/or the processing system 1614 of the apparatus 1402' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
dividing a subframe into six partitions, the subframe for transmitting at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol transmitted in the subframe is different than the tone spacing of each of the plurality of MBSFN symbols transmitted in the subframe;
designating a first partition of the subframe for transmitting the at least one unicast symbol;
designating a second partition through sixth partition of the subframe for respectively transmitting the plurality of MBSFN symbols;
determining the length of each CP associated with the plurality of MBSFN symbols to be at least 33.33 µs;
transmitting at least one unicast signal in the first partition, the at least one unicast signal including the at least one unicast symbol; and
transmitting at least one MBSFN signal in the second partition through sixth partition, the at least one MBSFN signal including the plurality of MBSFN symbols respectively in the second partition through sixth partition, each MBSFN symbol having the associated CP with the length of at least 33.33 µs;
wherein the transmitting the at least one unicast signal comprises transmitting one unicast symbol in the first partition of the subframe, the method further comprising at least one of:
refraining from transmission in a gap of a symbol associated with the at least one unicast symbol, the gap being between the at least one unicast symbol in the first partition of the subframe and a first MBSFN symbol in the second partition of the subframe; and
transmitting a second unicast symbol in the gap, wherein a length of the second unicast symbol does not occupy an entire length of the gap; or
extending, into the gap, a CP length of the first MBSFN symbol in the second partition of the subframe beyond 33.33 µs.

2. The method of claim 1, wherein the length of the CP associated with the at least one unicast symbol is based on a CP length of an initial subframe.

3. The method of claim 1, wherein the transmitting the at least one unicast signal comprises transmitting two unicast symbols in the first partition of the subframe.

4. The method of claim 1, wherein the second unicast symbol is configured for transmitting an additional unicast reference signal or a redundant unicast control signal.

5. The method of claim 1, wherein an extended MBMS CP length of the first MBSFN symbol in the second partition of the subframe is equal to a sum of 33.33 µs and a length of the gap.

6. The method of claim 1, further comprising transmitting an indication message including at least one of a CP type or a CP length for the MBSFN symbols of the subframe.

7. The method of claim 6, wherein the indication message is transmitted via at least one of a system information message, a multicast control channel (MCCH), or MBMS scheduling information (MSI).

8. A method of wireless communication, comprising:
receiving at least one transmission in a subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol received in the subframe is different than the tone spacing of each of the plurality of MBSFN symbols received in the subframe;
receiving at least one unicast signal including the at least one unicast symbol at a first partition of the subframe; and
receiving at least one MBSFN signal including the plurality of MBSFN symbols respectively at a second partition through sixth partition of the subframe, each MBSFN symbol having the associated CP with a length of at least 33.33 µs;
wherein the receiving the at least one unicast signal comprises receiving one unicast symbol in the first partition of the subframe, the method further comprising at least one of:

refraining from reception in a gap of a symbol associated with the at least one unicast symbol, the gap being between the at least one unicast symbol in the first partition of the subframe and a first MBSFN symbol in the second partition of the subframe; and receiving a second unicast symbol in the gap, wherein a length of the second unicast symbol does not occupy an entire length of the gap; or receiving, in the gap, the first MBSFN symbol in the second partition of the subframe with an extended MBMS CP length beyond 33.33 µs.

9. The method of claim 8, wherein the length of the CP associated with the at least one unicast symbol is based on a CP length of an initial subframe.

10. The method of claim 8, wherein the receiving the at least one unicast signal comprises receiving two unicast symbols in the first partition of the subframe.

11. The method of claim 8, wherein the second unicast symbol is configured for receiving an additional unicast reference signal or a redundant unicast control signal.

12. The method of claim 8, wherein the extended MBMS CP length of the first MBSFN symbol in the second partition of the subframe is equal to a sum of 33.33 µs and a length of the gap.

13. The method of claim 8, further comprising receiving an indication message including at least one of a CP type or a CP length for the MBSFN symbols of the subframe.

14. The method of claim 13, wherein the indication message is received via at least one of a system information message, a multicast control channel (MCCH), or MBMS scheduling information (MSI).

15. The method of claim 8, further comprising:
receiving at least one transmission in a second subframe, the second subframe divided into 12 partitions and for receiving at least one unicast symbol and a plurality of MBSFN symbols, each of the at least one unicast symbol and the plurality of MBSFN symbols of the second subframe having an associated cyclic prefix (CP);

receiving at least one unicast signal including at least one of a first unicast symbol at a first partition of the second subframe or a second unicast symbol at a second partition of the second subframe; and receiving at least one MBSFN signal including the plurality of MBSFN symbols respectively at a third partition through twelfth partition of the second subframe, each MBSFN symbol having the associated CP with a length of 16.67 µs.

16. An apparatus for wireless communication, comprising:
means for dividing a subframe into six partitions, the subframe for transmitting at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol transmitted in the subframe is different than the tone spacing of each of the plurality of MBSFN symbols transmitted in the subframe;

means for designating a first partition of the subframe for transmitting the at least one unicast symbol;

means for designating a second partition through sixth partition of the subframe for respectively transmitting the plurality of MBSFN symbols;

means for determining the length of each CP associated with the plurality of MBSFN symbols to be at least 33.33 µs;

means for transmitting at least one unicast signal in the first partition, the at least one unicast signal including the at least one unicast symbol; and means for transmitting at least one MBSFN signal in the second partition through sixth partition, the at least one MBSFN signal including the plurality of MBSFN symbols respectively in the second partition through sixth partition, each MBSFN symbol having the associated CP with the length of at least 33.33 µs;

wherein the means for transmitting the at least one unicast signal is configured to transmit one unicast symbol in the first partition of the subframe, the apparatus further comprising at least one of:

means for refraining from transmission in a gap of a symbol associated with the at least one unicast symbol, the gap being between the at least one unicast symbol in the first partition of the subframe and a first MBSFN symbol in the second partition of the subframe; and means for transmitting a second unicast symbol in the gap, wherein a length of the second unicast symbol does not occupy an entire length of the gap; or means for extending, into the gap, a CP length of the first MBSFN symbol in the second partition of the subframe beyond 33.33 µs.

17. The apparatus of claim 16, wherein the length of the CP associated with the at least one unicast symbol is based on a CP length of an initial subframe.

18. The apparatus of claim 16, wherein the means for transmitting the at least one unicast signal is configured to transmit two unicast symbols in the first partition of the subframe.

19. The apparatus of claim 16, wherein the means for configuring the second unicast symbol is configured to transmit an additional unicast reference signal or a redundant unicast control signal.

20. The apparatus of claim 16, wherein an extended MBMS CP length of the first MBSFN symbol in the second partition of the subframe is equal to a sum of 33.33 µs and a length of the gap.

21. The apparatus of claim 16, further comprising means for transmitting an indication message including at least one of a CP type or a CP length for the MBSFN symbols of the subframe.

22. The apparatus of claim 21, wherein the indication message is transmitted via at least one of a system information message, a multicast control channel (MCCH), or MBMS scheduling information (MSI).

23. An apparatus for wireless communication, comprising:
means for receiving at least one transmission in a subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol received in the subframe is different than the tone spacing of each of the plurality of MBSFN symbols received in the subframe;

means for receiving at least one unicast signal including the at least one unicast symbol at a first partition of the subframe; and means for receiving at least one MBSFN signal including the plurality of MBSFN symbols respectively at a second partition through sixth partition of the subframe, each MBSFN symbol having the associated CP with a length of at least 33.33 µs;

wherein the means for refraining from reception in a gap of a symbol associated with the at least one unicast symbol, the gap being between the at least one unicast symbol in the first partition of the subframe, the apparatus further comprising at least one of:

means for receiving no symbol in a gap between the one unicast symbol in the first partition of the subframe and a first MBSFN symbol in the second partition of the subframe; and means for receiving a second unicast symbol in the gap, wherein a length of the second unicast symbol does not occupy an entire length of the gap; or means for receiving, in the gap, the first MBSFN symbol in the second partition of the subframe with an extended MBMS CP length beyond 33.33 µs.

24. The apparatus of claim 23, wherein the length of the CP associated with the at least one unicast symbol is based on a CP length of an initial subframe.

25. The apparatus of claim 23, wherein the means for receiving the at least one unicast signal is configured to receive two unicast symbols in the first partition of the subframe.

26. The apparatus of claim 23, wherein the means for receiving the second unicast symbol is configured to receive an additional unicast reference signal or a redundant unicast control signal.

27. The apparatus of claim 23, wherein the extended MBMS CP length of the first MBSFN symbol in the second partition of the subframe is equal to a sum of 33.33 µs and a length of the gap.

28. The apparatus of claim 23, further comprising means for receiving an indication message including at least one of a CP type or a CP length for the MBSFN symbols of the subframe.

29. The apparatus of claim 28, wherein the indication message is received via at least one of a system information message, a multicast control channel (MCCH), or MBMS scheduling information (MSI).

30. The apparatus of claim 23, further comprising:

means for receiving at least one transmission in a second subframe, the second subframe divided into 12 partitions and for receiving at least one unicast symbol and a plurality of MBSFN symbols, each of the at least one unicast symbol and the plurality of MBSFN symbols of the second subframe having an associated cyclic prefix (CP);

means for receiving at least one unicast signal including at least one of a first unicast symbol at a first partition of the second subframe or a second unicast symbol at a second partition of the second subframe; and means for receiving at least one MBSFN signal including the plurality of MBSFN symbols respectively at a third partition through twelfth partition of the second subframe, each MBSFN symbol having the associated CP with a length of 16.67 µs.

31. An apparatus for wireless communication, comprising:
a processing system configured to:
divide a subframe into six partitions, the subframe for transmitting at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol transmitted in the subframe is different than the tone spacing of each of the plurality of MBSFN symbols transmitted in the subframe;

designate a first partition of the subframe for transmitting the at least one unicast symbol;

designate a second partition through sixth partition of the subframe for respectively transmitting the plurality of MBSFN symbols;

determine the length of each CP associated with the plurality of MBSFN symbols to be at least 33.33 µs;

transmit at least one unicast signal in the first partition, the at least one unicast signal including the at least one unicast symbol; and transmit at least one MBSFN signal in the second partition through sixth partition, the at least one MBSFN signal including the plurality of MBSFN symbols respectively in the second partition through sixth partition, each MBSFN symbol having the associated CP with the length of at least 33.33 µs;

wherein the processing system transmits the at least one unicast signal by transmitting one unicast symbol in the first partition of the subframe, the processing system further configured to perform at least one of:

refrain from transmission in a gap of a symbol associated with the at least one unicast symbol, the gap being between the at least one unicast symbol in the first partition of the subframe and a first MBSFN symbol in the second partition of the subframe; and transmit a second unicast symbol in the gap, wherein a length of the second unicast symbol does not occupy an entire length of the gap; or extend, into the gap, a CP length of the first MBSFN symbol in the second partition of the subframe beyond 33.33 µs.

32. The apparatus of claim 31, wherein the length of the CP associated with the at least one unicast symbol is based on a CP length of an initial subframe.

33. The apparatus of claim 31, wherein the processing system transmits the at least one unicast signal by transmitting two unicast symbols in the first partition of the subframe.

34. The apparatus of claim 31, wherein the processing system that is configured to configure the second unicast symbol is further configured to transmit an additional unicast reference signal or a redundant unicast control signal.

35. The apparatus of claim 31, wherein an extended MBMS CP length of the first MBSFN symbol in the second partition of the subframe is equal to a sum of 33.33 µs and a length of the gap.

36. The apparatus of claim 31, the processing system further configured to transmit an indication message including at least one of a CP type or a CP length for the MBSFN symbols of the subframe.

37. The apparatus of claim 36, wherein the indication message is transmitted via at least one of a system information message, a multicast control channel (MCCH), or MBMS scheduling information (MSI).

38. An apparatus for wireless communication, comprising:
a processing system configured to:
receive at least one transmission in a subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol received in the subframe is different than the tone spacing of each of the plurality of MBSFN symbols received in the subframe;

receive at least one unicast signal including the at least one unicast symbol at a first partition of the subframe; and receive at least one MBSFN signal including the plurality of MBSFN symbols respectively at a second partition through sixth partition of the subframe, each MBSFN symbol having the associated CP with a length of at least 33.33 µs;

wherein the processing system receives the at least one unicast signal by receiving one unicast symbol in the first partition of the subframe, the processing system further configured to perform at least one of:

refrain from reception in a gap of a symbol associated with the at least one unicast symbol, the gap being between the at least one unicast symbol in the first partition of the subframe and a first MBSFN symbol in the second partition of the subframe; and receive a second unicast symbol in the gap, wherein a length of the second unicast symbol does not occupy an entire length of the gap; or receive, in the gap, the first MBSFN symbol in the second partition of the subframe with an extended MBMS CP length beyond 33.33 µs.

39. The apparatus of claim 38, wherein the length of the CP associated with the at least one unicast symbol is based on a CP length of an initial subframe.

40. The apparatus of claim 38, wherein the processing system receives the at least one unicast signal by receiving two unicast symbols in the first partition of the subframe.

41. The apparatus of claim 38, wherein the processing system that is configured to receive the second unicast symbol is further configured to receive an additional unicast reference signal or a redundant unicast control signal.

42. The apparatus of claim 38, wherein the extended MBMS CP length of the first MBSFN symbol in the second partition of the subframe is equal to a sum of 33.33 µs and a length of the gap.

43. The apparatus of claim 38, the processing system further configured to receive an indication message including at least one of a CP type or a CP length for the MBSFN symbols of the subframe.

44. The apparatus of claim 43, wherein the indication message is received via at least one of a system information message, a multicast control channel (MCCH), or MBMS scheduling information (MSI).

45. The apparatus of claim 38, the processing system further configured to:

receive at least one transmission in a second subframe, the second subframe divided into 12 partitions and for receiving at least one unicast symbol and a plurality of MBSFN symbols, each of the at least one unicast symbol and the plurality of MBSFN symbols of the second subframe having an associated cyclic prefix (CP);

receive at least one unicast signal including at least one of a first unicast symbol at a first partition of the second subframe or a second unicast symbol at a second partition of the second subframe; and receive at least one MBSFN signal including the plurality of MBSFN symbols respectively at a third partition through twelfth partition of the second subframe, each MBSFN symbol having the associated CP with a length of 16.67 µs.

46. A non-transitory computer-readable medium comprising code that when executed on at least one processor causes the at least one processor to:

divide a subframe into six partitions, the subframe for transmitting at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol transmitted in the subframe is different than the tone spacing of each of the plurality of MBSFN symbols transmitted in the subframe;

designate a first partition of the subframe for transmitting the at least one unicast symbol;

designate a second partition through sixth partition of the subframe for respectively transmitting the plurality of MBSFN symbols;

determine the length of each CP associated with the plurality of MBSFN symbols to be at least 33.33 µs;

transmit at least one unicast signal in the first partition, the at least one unicast signal including the at least one unicast symbol; and transmit at least one MBSFN signal in the second partition through sixth partition, the at least one MBSFN signal including the plurality of MBSFN symbols respectively in the second partition through sixth partition, each MBSFN symbol having the associated CP with the length of at least 33.33 µs;

wherein the code for transmitting the at least one unicast signal is configured to transmit one unicast symbol in the first partition of the subframe, the non-transitory computer-readable medium further comprising at least one of:

code for refraining from transmission in a gap of a symbol associated with the at least one unicast symbol, the gap being between the at least one unicast symbol in the first partition of the subframe and a first MBSFN symbol in the second partition of the subframe; and code for transmitting a second unicast symbol in the gap, wherein a length of the second unicast symbol does not occupy an entire length of the gap; or code for extending, into the gap, a CP length of the first MBSFN symbol in the second partition of the subframe beyond 33.33 µs.

47. The non-transitory computer-readable medium of claim 46, wherein the length of the CP associated with the at least one unicast symbol is based on a CP length of an initial subframe.

48. The non-transitory computer-readable medium of claim 46, wherein the code for transmitting the at least one unicast signal is configured to transmit two unicast symbols in the first partition of the subframe.

49. The non-transitory computer-readable medium of claim 46, wherein the code for configuring the second unicast symbol is configured to transmit an additional unicast reference signal or a redundant unicast control signal.

50. The non-transitory computer-readable medium of claim 46, wherein an extended MBMS CP length of the first MBSFN symbol in the second partition of the subframe is equal to a sum of 33.33 µs and a length of the gap.

51. The non-transitory computer-readable medium of claim 46, further comprising code that when executed on the at least one processor causes the at least one processor to transmit an indication message including at least one of a CP type or a CP length for the MBSFN symbols of the subframe.

52. The non-transitory computer-readable medium of claim 51, wherein the indication message is transmitted via at least one of a system information message, a multicast control channel (MCCH), or MBMS scheduling information (MSI).

53. A non-transitory computer-readable medium comprising code that when executed on at least one processor causes the at least one processor to:
- receive at least one transmission in a subframe, the subframe divided into six partitions and for receiving at least one unicast symbol and a plurality of multicast-broadcast single frequency network (MBSFN) symbols, each of the at least one unicast symbol and the plurality of MBSFN symbols having an associated cyclic prefix (CP), wherein a length of the CP associated with the at least one unicast symbol is different from a length of each CP associated with the plurality of MBSFN symbols, and wherein a tone spacing of the at least one unicast symbol received in the subframe is different than the tone spacing of each of the plurality of MBSFN symbols received in the subframe;
- receive at least one unicast signal including the at least one unicast symbol at a first partition of the subframe; and
- receive at least one MBSFN signal including the plurality of MBSFN symbols respectively at a second partition through sixth partition of the subframe, each MBSFN symbol having the associated CP with a length of at least 33.33 μs;
- wherein the code for receiving the at least one unicast signal is configured to receive one unicast symbol in the first partition of the subframe, the non-transitory computer-readable medium further comprising at least one of:
- code for refraining from reception in a gap of a symbol associated with the at least one unicast symbol, the gap being between the at least one unicast symbol in the first partition of the subframe and a first MBSFN symbol in the second partition of the subframe; and
- code for receiving a second unicast symbol in the gap, wherein a length of the second unicast symbol does not occupy an entire length of the gap; or
- code for receiving, in the gap, the first MBSFN symbol in the second partition of the subframe with an extended MBMS CP length beyond 33.33 μs.

54. The non-transitory computer-readable medium of claim 53, wherein the length of the CP associated with the at least one unicast symbol is based on a CP length of an initial subframe.

55. The non-transitory computer-readable medium of claim 53, wherein the code for receiving the at least one unicast signal is configured to receive two unicast symbols in the first partition of the subframe.

56. The non-transitory computer-readable medium of claim 53, wherein the code for receiving the second unicast symbol is configured to receive an additional unicast reference signal or a redundant unicast control signal.

57. The non-transitory computer-readable medium of claim 53, wherein the extended MBMS CP length of the first MBSFN symbol in the second partition of the subframe is equal to a sum of 33.33 μs and a length of the gap.

58. The non-transitory computer-readable medium of claim 53, further comprising code that when executed on the at least one processor causes the at least one processor to receive an indication message including at least one of a CP type or a CP length for the MBSFN symbols of the subframe.

59. The non-transitory computer-readable medium of claim 58, wherein the indication message is received via at least one of a system information message, a multicast control channel (MCCH), or MBMS scheduling information (MSI).

60. The non-transitory computer-readable medium of claim 53, further comprising code that when executed on the at least one processor causes the at least one processor to:
- receive at least one transmission in a second subframe, the second subframe divided into 12 partitions and for receiving at least one unicast symbol and a plurality of MBSFN symbols, each of the at least one unicast symbol and the plurality of MBSFN symbols of the second subframe having an associated cyclic prefix (CP);
- receive at least one unicast signal including at least one of a first unicast symbol at a first partition of the second subframe or a second unicast symbol at a second partition of the second subframe; and
- receive at least one MBSFN signal including the plurality of MBSFN symbols respectively at a third partition through twelfth partition of the second subframe, each MBSFN symbol having the associated CP with a length of 16.67 μs.

* * * * *